(12) United States Patent
Crump et al.

(10) Patent No.: US 12,435,774 B2
(45) Date of Patent: Oct. 7, 2025

(54) TOOTH JUMP PROTECTION DEVICE

(71) Applicant: BorgWarner, Inc., Auburn Hills, MI (US)

(72) Inventors: Matthew W. Crump, Cortland, NY (US); Christopher Van Loon, Ithaca, NY (US); Sean R Simmons, Ithaca, NY (US); Timothy K. White, Sterling Heights, MI (US); Joseph P. Goodsell, Groton, NY (US); Bradley F. Adams, Homer, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 48 days.

(21) Appl. No.: 18/458,719

(22) Filed: Aug. 30, 2023

(65) Prior Publication Data

US 2023/0407949 A1    Dec. 21, 2023

Related U.S. Application Data

(63) Continuation-in-part of application No. 17/648,617, filed on Jan. 21, 2022, now Pat. No. 12,320,425.
(Continued)

(51) Int. Cl.
*F16H 7/18*    (2006.01)
*B60K 17/342*  (2006.01)
(Continued)

(52) U.S. Cl.
CPC ............. *F16H 7/18* (2013.01); *B60K 17/342* (2013.01); *F16H 7/06* (2013.01); *F16H 7/0829* (2013.01);
(Continued)

(58) Field of Classification Search
CPC ..... F16H 7/00; F16H 7/06; F16H 7/08; F16H 2007/081; F16H 2007/0804;
(Continued)

(56) References Cited

U.S. PATENT DOCUMENTS 1,579,681 A    4/1926  John
1,892,067 A *  12/1932 McMillan ............. F16H 7/1254
                                                    123/90.31

(Continued)

FOREIGN PATENT DOCUMENTS

CN    2859091      1/2007
CN    109667898 A  4/2019
(Continued)

OTHER PUBLICATIONS

Bonart, Jakob et al., "Enhancing End-of-Line Defect Classifications and Evaluating Early Testability for Inline Test Stands Using NVH Measurements", 2021, IEEE. (Year: 2021).
(Continued)

*Primary Examiner* — Anna M Momper
*Assistant Examiner* — Raveen J Dias
(74) *Attorney, Agent, or Firm* — Brown & Michaels, PC

(57) ABSTRACT

A tooth jump protection device is used to control chain slack and delay the torque at which chain jump occurs, thus increasing jump torque performance. The tooth jump protection device is preferably mounted to the transfer case.

29 Claims, 20 Drawing Sheets

Related U.S. Application Data

(60) Provisional application No. 63/218,129, filed on Jul. 2, 2021, provisional application No. 63/140,448, filed on Jan. 22, 2021.

(51) Int. Cl.
  *F16H 7/06* (2006.01)
  *F16H 7/08* (2006.01)

(52) U.S. Cl.
  CPC ............... *F16H 2007/0872* (2013.01); *F16H 2007/0874* (2013.01); *F16H 2007/185* (2013.01)

(58) Field of Classification Search
  CPC ..... F16H 2007/0842; F16H 2007/0844; F16H 2007/0846; F16H 2007/0863; F16H 2007/0865; F16H 2007/0872; F16H 2007/0874; F16H 2007/0893; F16H 7/18; F16H 2007/185; F02B 67/04; F02B 67/06; B60K 17/342; B60K 17/344; B60K 23/00; B60K 57/05
  See application file for complete search history.

(56) References Cited

U.S. PATENT DOCUMENTS

| | | | |
|---|---|---|---|
| 2,129,107 A * | 9/1938 | Taylor | F16H 7/08 474/111 |
| 2,191,946 A | 2/1940 | John | |
| 2,210,276 A * | 8/1940 | Bremer | F16H 7/0848 474/111 |
| 2,355,003 A * | 8/1944 | McCann | F16H 57/05 474/111 |
| 2,601,789 A * | 7/1952 | Riopelle | F16H 7/18 474/140 |
| 2,766,634 A * | 10/1956 | Frank | F16F 7/00 474/146 |
| 3,334,524 A | 8/1967 | Chalk | |
| 3,441,009 A | 4/1969 | Rafanelli | |
| 3,455,178 A | 7/1969 | Ruoff et al. | |
| 3,656,361 A * | 4/1972 | Honda | F16G 13/04 474/140 |
| 3,673,884 A * | 7/1972 | Southiere | B62D 55/07 474/111 |
| 3,817,113 A | 6/1974 | Pfarrwaller | |
| 4,069,719 A | 1/1978 | Cancilla | |
| 4,337,055 A | 6/1982 | Mackay et al. | |
| 4,457,741 A | 7/1984 | Hoeptner, III | |
| 4,662,862 A * | 5/1987 | Matson | F16H 7/08 474/111 |
| 4,869,708 A * | 9/1989 | Hoffmann | F16H 7/18 474/140 |
| 5,000,724 A | 3/1991 | Reid | |
| 5,049,114 A | 9/1991 | Hayden | |
| 5,122,098 A | 6/1992 | Kanehira | |
| 5,180,340 A * | 1/1993 | Vahabzadeh | F16H 7/08 474/140 |
| 5,234,381 A | 8/1993 | Vahabzadeh et al. | |
| 5,286,234 A * | 2/1994 | Young | F16H 7/08 474/140 |
| 5,306,212 A | 4/1994 | Eberle | |
| 5,320,582 A * | 6/1994 | Takeda | F16H 7/06 74/89.21 |
| 5,445,568 A | 8/1995 | Fukuzawa et al. | |
| 5,524,725 A | 6/1996 | Schantzen | |
| 5,730,674 A | 3/1998 | Ott | |
| 5,776,024 A | 7/1998 | White et al. | |
| 5,797,818 A | 8/1998 | Young | |
| 5,846,150 A | 12/1998 | Wigsten | |
| 5,938,551 A | 8/1999 | Warner | |
| 5,961,411 A | 10/1999 | Tsutsumi et al. | |
| 5,967,922 A | 10/1999 | Ullein et al. | |
| 6,062,998 A | 5/2000 | Kumakura et al. | |
| 6,117,034 A | 9/2000 | Vine | |
| 6,129,644 A * | 10/2000 | Inoue | F16H 7/0836 474/111 |
| 6,240,887 B1 * | 6/2001 | Tosaka | F02B 75/243 123/90.31 |
| 6,302,816 B1 * | 10/2001 | Wigsten | F16H 7/18 474/140 |
| 6,322,470 B1 | 11/2001 | Markley et al. | |
| 6,358,169 B1 * | 3/2002 | Markley | F16H 7/08 474/140 |
| 6,375,587 B1 * | 4/2002 | Wigsten | F16H 7/08 474/140 |
| 6,412,464 B1 * | 7/2002 | Schneider | F02B 75/22 123/90.31 |
| 6,440,020 B1 | 8/2002 | Tada | |
| 6,572,502 B1 | 6/2003 | Young et al. | |
| 6,599,209 B1 | 7/2003 | Ullein et al. | |
| 6,849,015 B2 | 2/2005 | Markley et al. | |
| 7,063,635 B2 | 6/2006 | Garcia | |
| 7,597,640 B2 | 10/2009 | Markley et al. | |
| 7,641,577 B2 | 1/2010 | Markley et al. | |
| 8,348,792 B2 | 1/2013 | He | |
| 8,900,079 B2 | 12/2014 | Mori et al. | |
| 9,482,336 B2 | 11/2016 | Utaki | |
| 9,534,516 B2 | 1/2017 | Utaki | |
| 9,759,292 B2 | 9/2017 | Moura et al. | |
| 9,797,483 B2 | 10/2017 | Kurono et al. | |
| 10,017,204 B2 | 7/2018 | Kim | |
| 10,054,213 B1 | 8/2018 | Alexiou et al. | |
| 10,487,921 B2 * | 11/2019 | Voges | F02F 1/24 |
| 10,612,630 B2 | 4/2020 | Konno et al. | |
| 11,796,040 B2 * | 10/2023 | Crump | F16H 7/06 |
| 12,078,245 B2 * | 9/2024 | Crump | G06F 30/17 |
| 2002/0042316 A1 * | 4/2002 | Young, Jr. | B62J 13/00 474/140 |
| 2002/0045503 A1 | 4/2002 | Young et al. | |
| 2002/0115511 A1 | 8/2002 | Tada | |
| 2002/0160868 A1 | 10/2002 | Wigsten et al. | |
| 2003/0062015 A1 * | 4/2003 | Garza | F02B 67/06 123/192.2 |
| 2003/0228948 A1 | 12/2003 | Garbagnati et al. | |
| 2004/0005952 A1 * | 1/2004 | Bachmair | F01L 1/02 474/140 |
| 2004/0067806 A1 | 4/2004 | Markley et al. | |
| 2005/0075204 A1 * | 4/2005 | Cholewczynski | F16H 7/18 474/140 |
| 2005/0085322 A1 | 4/2005 | Markley | |
| 2005/0107196 A1 | 5/2005 | Konno et al. | |
| 2006/0100047 A1 | 5/2006 | Churchill et al. | |
| 2006/0270502 A1 | 11/2006 | Markley et al. | |
| 2006/0293134 A1 | 12/2006 | Markley et al. | |
| 2007/0093328 A1 | 4/2007 | Markley | |
| 2008/0070731 A1 * | 3/2008 | Vrsek | F16H 7/1281 474/134 |
| 2009/0111629 A1 | 4/2009 | Kobara et al. | |
| 2009/0143177 A1 | 6/2009 | Nakano et al. | |
| 2009/0156339 A1 | 6/2009 | Yokoyama | |
| 2009/0205206 A1 * | 8/2009 | Markley | F16H 7/08 474/140 |
| 2009/0275430 A1 | 11/2009 | Markley | |
| 2009/0325750 A1 | 12/2009 | Wigsten et al. | |
| 2010/0203991 A1 | 8/2010 | He | |
| 2010/0210384 A1 | 8/2010 | Young et al. | |
| 2010/0248876 A1 | 9/2010 | Kroon et al. | |
| 2011/0077114 A1 | 3/2011 | Markley | |
| 2012/0129636 A1 | 5/2012 | Lee et al. | |
| 2012/0225744 A1 | 9/2012 | Markley | |
| 2013/0059686 A1 | 3/2013 | Markley et al. | |
| 2013/0059687 A1 | 3/2013 | Markley | |
| 2015/0330482 A1 | 11/2015 | Todd et al. | |
| 2016/0084358 A1 * | 3/2016 | Yuan | F16H 9/24 474/148 |
| 2016/0102738 A1 | 4/2016 | Von Vopelius-Feldt et al. | |
| 2016/0186840 A1 * | 6/2016 | Cipollone | F16H 7/08 474/140 |
| 2016/0238104 A1 | 8/2016 | Vroman et al. | |
| 2016/0265632 A1 | 9/2016 | Young et al. | |
| 2017/0009849 A1 * | 1/2017 | Stiglmaier | F16H 7/18 |

(56) References Cited

U.S. PATENT DOCUMENTS

| | | | |
|---|---|---|---|
| 2017/0108111 A1* | 4/2017 | Steward | F16H 57/0457 |
| 2017/0276216 A1* | 9/2017 | Perissinotto | F16H 7/18 |
| 2018/0163848 A1 | 6/2018 | Quinn et al. | |
| 2018/0266312 A1 | 9/2018 | Iwagami et al. | |
| 2018/0274674 A1* | 9/2018 | Werny | G01L 5/042 |
| 2018/0334928 A1 | 11/2018 | Yamauchi et al. | |
| 2019/0003558 A1 | 1/2019 | Kumar et al. | |
| 2019/0071286 A1* | 3/2019 | Dong | B66B 23/04 |
| 2019/0072175 A1 | 3/2019 | Klar et al. | |
| 2020/0157976 A1* | 5/2020 | Takahashi | F02B 67/06 |
| 2021/0262552 A1 | 8/2021 | Seki et al. | |
| 2022/0235851 A1* | 7/2022 | Crump | F16H 7/18 |
| 2022/0235852 A1* | 7/2022 | Crump | F16H 7/18 |
| 2022/0325783 A1 | 10/2022 | Schroeder et al. | |
| 2023/0104355 A1 | 4/2023 | Pennazza et al. | |
| 2023/0383819 A1* | 11/2023 | Crump | G06F 30/17 |
| 2023/0407949 A1 | 12/2023 | Crump et al. | |
| 2024/0026956 A1* | 1/2024 | Crump | G06F 30/17 |

FOREIGN PATENT DOCUMENTS

| | | | | |
|---|---|---|---|---|
| DE | 4327314 A1 | 2/1994 | | |
| DE | 10014333 A1 | 3/2001 | | |
| DE | 102004013696 A1 | 10/2005 | | |
| DE | 102005004186 A1 * | 8/2006 | | B62D 5/0424 |
| DE | 102006025890 A1 | 12/2007 | | |
| DE | 102006055645 A1 | 5/2008 | | |
| DE | 112015002425 | 3/2017 | | |
| DE | 112017000089 | 5/2018 | | |
| DE | 102020104887 A1 | 8/2021 | | |
| EP | 1070875 A3 | 4/2001 | | |
| EP | 1164312 A2 | 12/2001 | | |
| EP | 1164312 A3 | 6/2007 | | |
| EP | 2589773 A1 | 5/2013 | | |
| GB | 2206175 A | 12/1988 | | |
| JP | S4993493 U | 8/1974 | | |
| JP | S5121782 U | 2/1976 | | |
| JP | s54133272 A | 10/1979 | | |
| JP | S56173248 | 7/1985 | | |
| JP | H03134351 A | 6/1991 | | |
| JP | H06280608 A | 10/1994 | | |
| JP | H07247858 A * | 9/1995 | | F16H 2007/185 |
| JP | H08184358 A * | 7/1996 | | F16H 2007/185 |
| JP | 2000274501 A | 10/2000 | | |
| JP | 3383825 B2 | 3/2003 | | |
| JP | 2003240061 A * | 8/2003 | | F16G 13/02 |
| JP | 200428218 | 1/2004 | | |
| JP | 2005042757 A | 2/2005 | | |
| JP | 2005042779 A | 2/2005 | | |
| JP | 2005075122 A | 3/2005 | | |
| JP | 2006138471 A | 6/2006 | | |
| JP | 2008143249 A | 6/2008 | | |
| JP | 2010014044 A * | 1/2010 | | F01L 1/024 |
| JP | 201213190 | 1/2012 | | |
| JP | 2014066322 A | 4/2014 | | |
| JP | 2019120243 A | 7/2019 | | |
| WO | 0026532 A1 | 5/2000 | | |
| WO | WO-2020068048 A1 * | 4/2020 | | F16H 7/18 |
| WO | WO-2020157457 A1 * | 8/2020 | | F16H 7/06 |
| WO | 2022186336 A1 | 9/2022 | | |

OTHER PUBLICATIONS

Cronwell, James C. et al., "Design, Construction and Instrumentation of a Machine to Measure Tension and Impact Forces in Roller Chain Drives", Feb. 27, 1995, Mech. Mach. Theory vol. 31, No. 4, Elsevier Science Ltd. (Year: 1995).

* cited by examiner

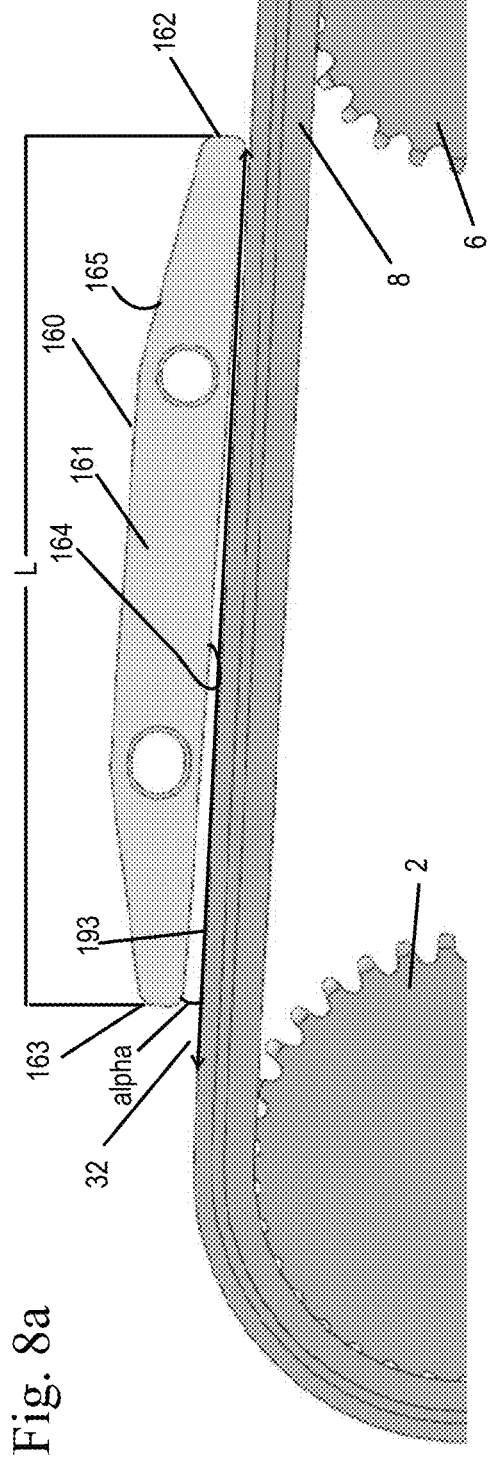
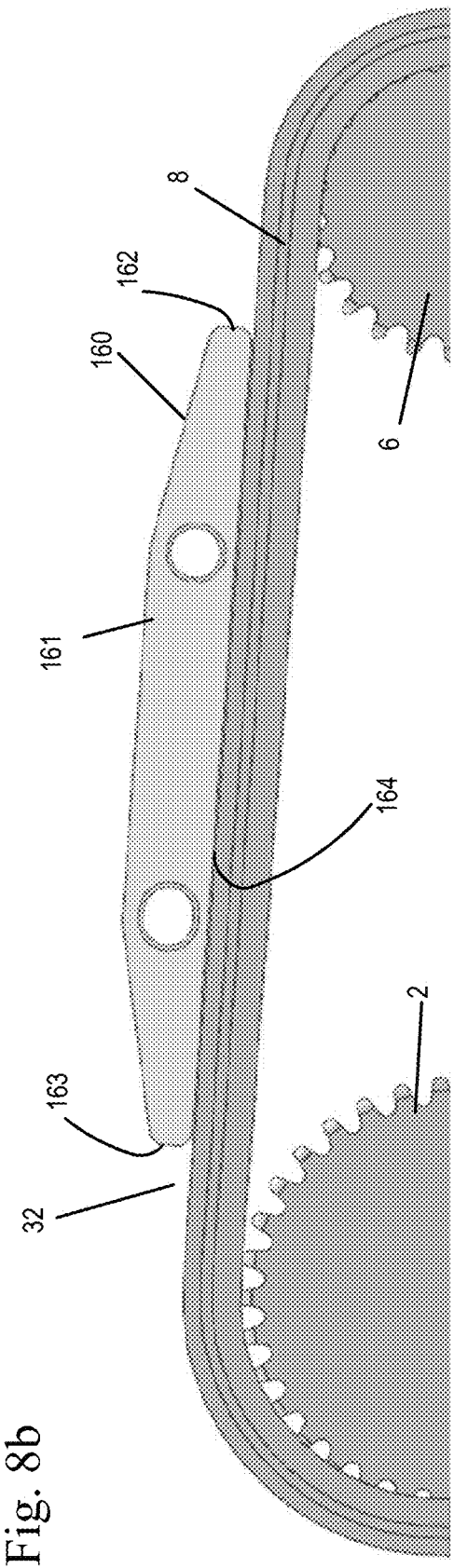
Fig. 8a
Fig. 8b

TOOTH JUMP PROTECTION DEVICE

CROSS-REFERENCE TO RELATED APPLICATIONS

This is a continuation-in-part application of application Ser. No. 17/648,617, filed Jan. 21, 2022, entitled "TOOTH JUMP PROTECTION", which claims priority pursuant to 35 U.S.C. 119(e) to United States Provisional Patent Application Nos. 63/140,448, filed Jan. 22, 2021, and 63/218,129, filed Jul. 2, 2021, the applications are incorporated herein by reference in their entirety.

BACKGROUND

The present invention relates to chain slack buildup, and more specifically to devices which control the location of chain slack buildup.

FIGS. 1a and 1b shows an approximate location of the slack accumulation relative to a driven sprocket 6 and a drive sprocket 2 of a conventional chain system 1, respectively. The drive sprocket 2 is connected to the driven sprocket 6 via a toothed chain 8. The chain 8 meshes with the sprockets 2, 6, transmitting rotary motion between the sprockets 2, 6. A chain 8 can jump on either the driven sprocket 6 or the drive sprocket 2 of a chain system 1. Jumping of the chain 8 near the driven sprocket 6 results in a chain 8 with a lower jump torque and jumping of the chain 8 near the drive sprocket 2 results in a higher jump torque of the chain 8. Therefore, forcing jumps to only occur on the drive sprocket 2 allows a chain's jump torque performance to be higher. There are specific locations in which chain slack collects relative to the driven or drive sprocket 6, 2, determining which sprocket the chain 8 will mostly likely jump. FIG. 1a shows the slack accumulation occurring at the driven sprocket 6, indicated by reference number 30 and FIG. 1b shows the slack accumulation occurring at the drive sprocket 2, indicated by reference number 32.

SUMMARY

According to one embodiment of the present invention, a tooth jump protection device is used to control chain slack and delay the torque at which chain jump occurs, thus increasing jump torque performance.

According to one embodiment, a chain drive system in a transfer case is disclosed. The chain drive system comprising: a drive sprocket; a driven sprocket; a chain connecting the drive sprocket to the driven sprocket, the chain having a slack strand between the driven sprocket and the driving sprocket and a tight strand between the driven sprocket and the driving sprocket; and at least a first tooth jump protection device mounted between the driven sprocket and the drive sprocket on the slack strand of the chain, with the first tooth jump protection device installed within the chain drive system at a distance from a centerline of the driven sprocket and a defining a gap distance between the at least first tooth jump protection device and the slack strand of the chain. The first tooth jump protection device comprises a snubber having a body with a first end and a second end separated by a length, the body comprising a first flat member at the first end, a second flat member at the first end and an angled ramp connecting the first flat member to the second member, the first flat member having a first flat member surface for contacting the slack strand of the chain and a second flat member surface of the second flat member defining the gap distance, such that the first flat member surface aids in controlling strand resonance of the chain and the second flat member surface is adapted to engage the slack strand of the chain to maintain the chain engaged with the driven sprocket and prevent chain slack buildup on the driven sprocket aids in controlling slack of the slack strand of the chain.

In one embodiment, the distance of the gap 410 is less than 1, and the distance 412 between the sprocket tangency and the first end of the TJPD 400a, 400b is less than 3 pitch lengths of the chain. In this embodiment, the TDPD 400a, 400b provides control of the strand resonance of the chain 8.

In another embodiment, the distance of the gap 410 is between 1-7 mm and the distance 412 between the sprocket tangency and the first end of the TJPD 400a, 400b is less than the distance of the gap 410. As the distance of the gap 410 increases, the distance 412 between the sprocket tangency and the first end of the TJPD 400a, 400b decreases.

In another embodiment, the distance of the gap 410 is 1.5 mm and the distance 412 between the sprocket tangency and the first end of the TJPD 400a, 400b is equivalent to 1 pitch length of the chain 8.

An angled surface of the angled ramp does not touch the slack strand of the chain.

A second tooth jump protection device can be mounted at a second engagement of the driven sprocket in which the tight strand of the chain exits the driven sprocket.

BRIEF DESCRIPTION OF THE DRAWINGS

FIG. 8a shows a schematic of a TJPD of a ramped snubber engaged with a chain within a transfer case.

FIG. 8b shows a schematic of the TJPD of the ramped snubber when tension is applied to the opposite chain strand.

FIG. 11b shows slack accumulation relative to the snubber of FIG. 11a.

DETAILED DESCRIPTION

In an embodiment of the present invention, a tooth jump protection device (TJPD), can be used to control chain slack within a transfer case, such that the chain slack only builds on the drive sprocket resulting in a higher jump torque. A higher jump torque capability allows for reduced chain width.

Figure 1A:
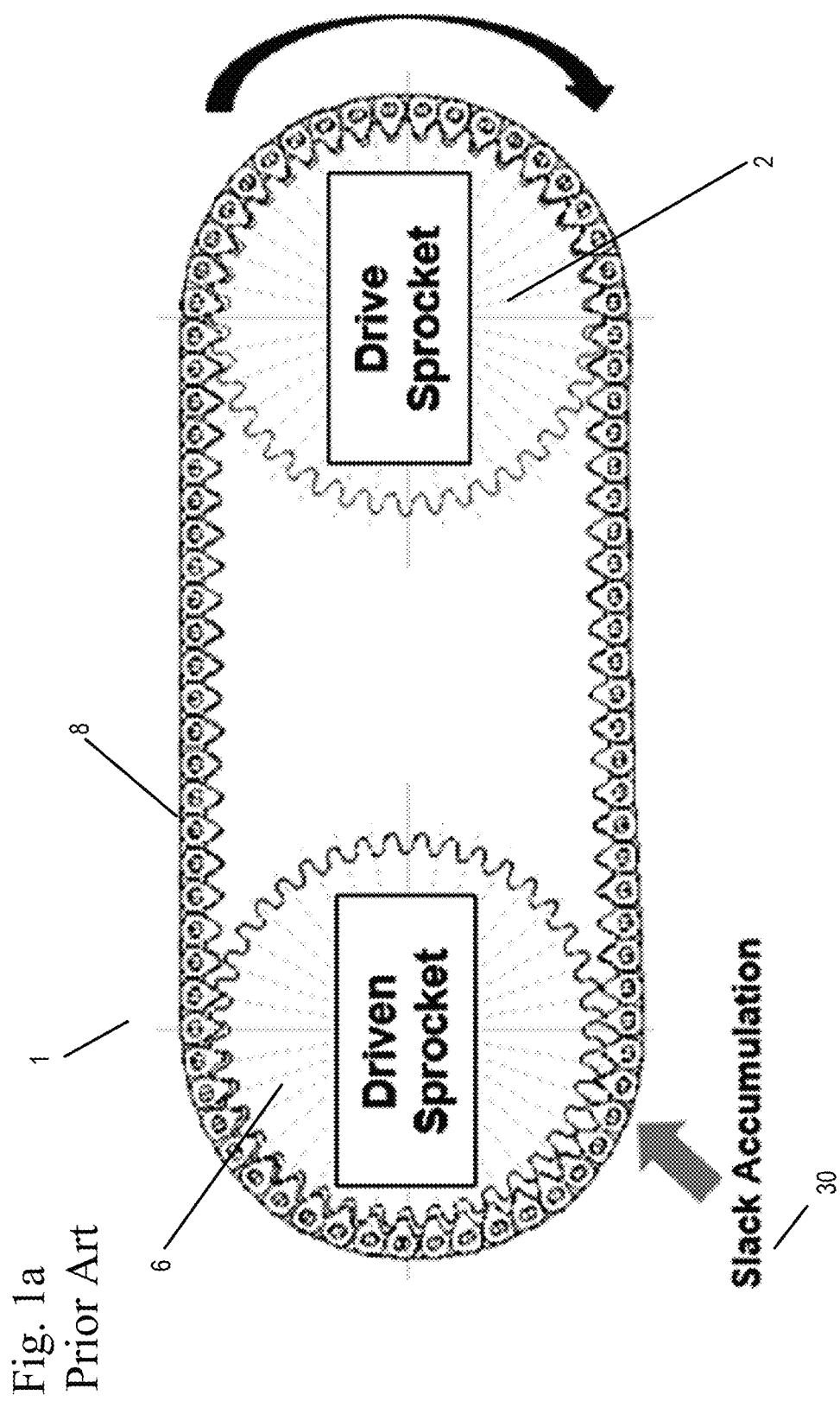
FIG. 1a shows a schematic of an approximate location of slack accumulation relative to the driven sprocket in a conventional chain system.
Figure 1B:
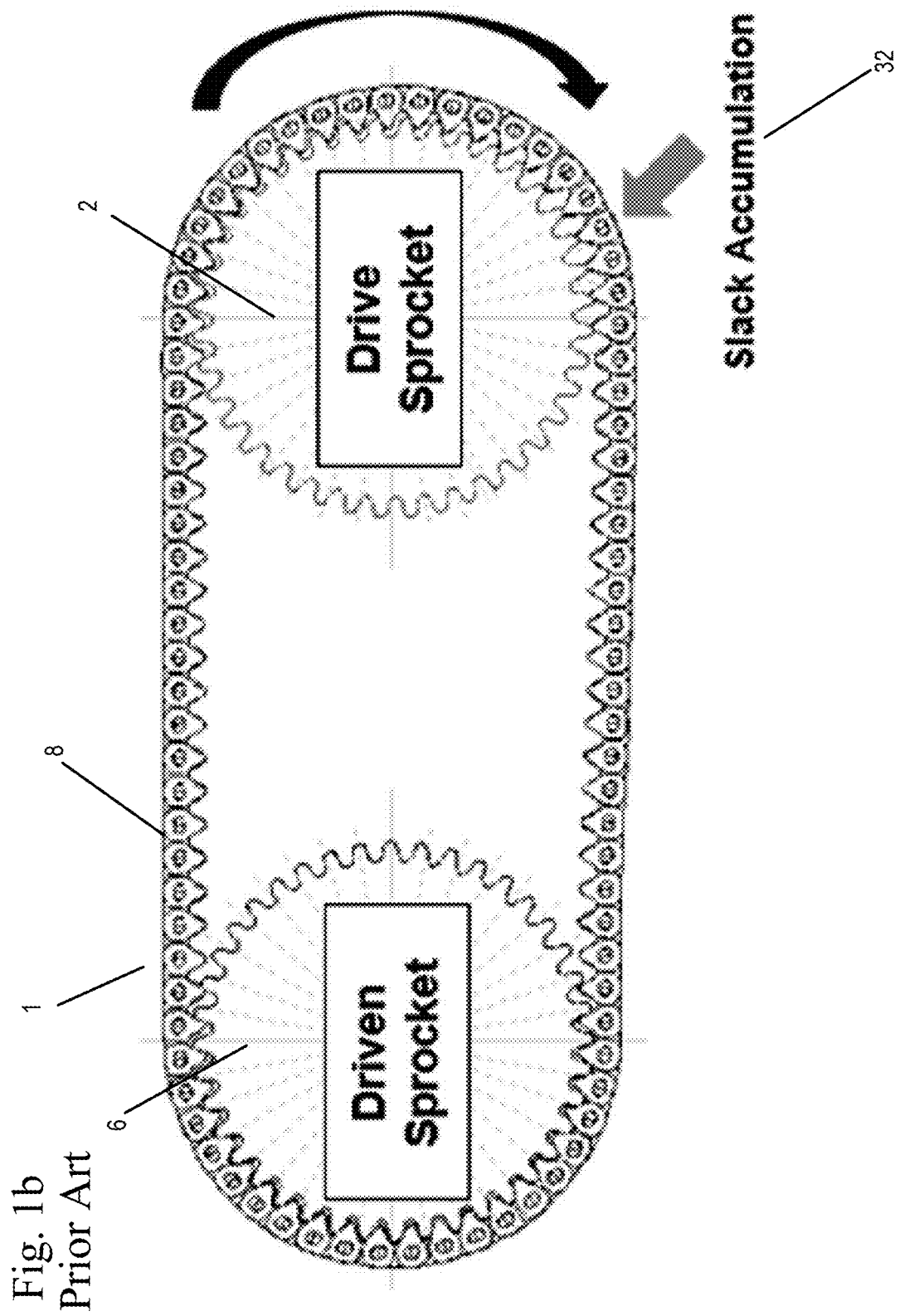
FIG. 1b shows a schematic of an approximate location of slack accumulation relative to the drive sprocket in a conventional chain system.
Figure 2:
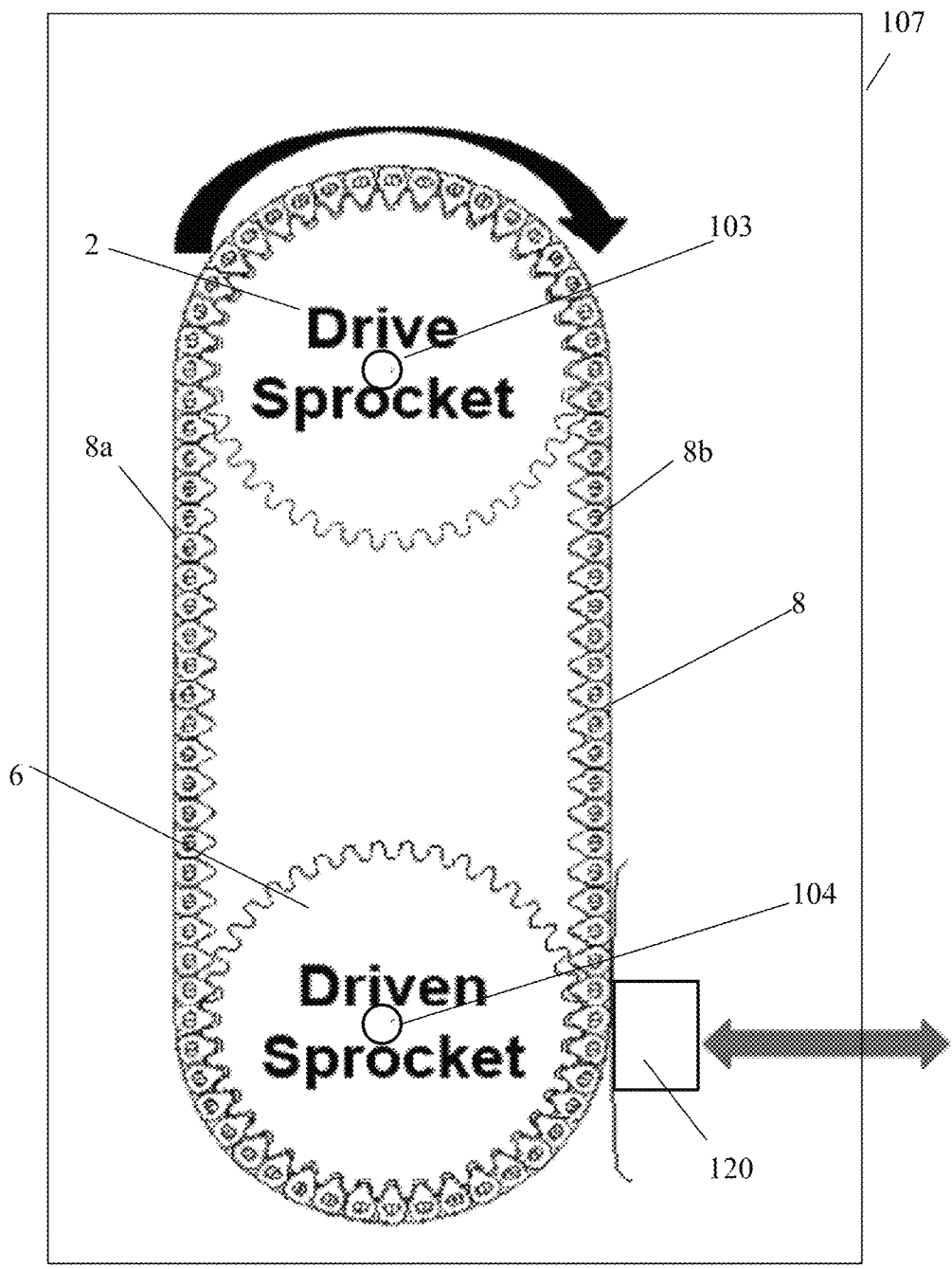
FIG. 2 shows a schematic of a vertically mounted drive system.
Figure 3:
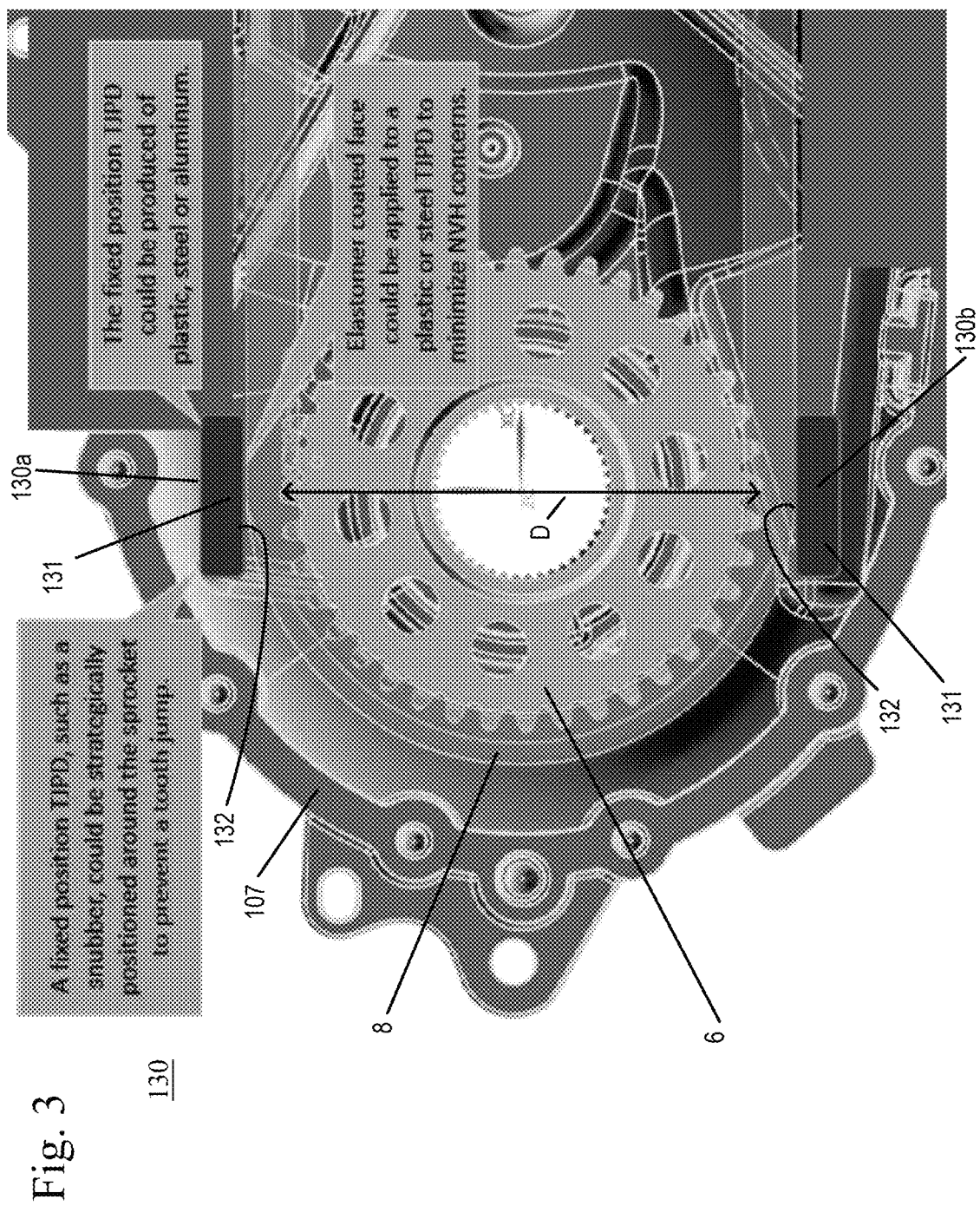
FIG. 3 shows a schematic of an embodiment of a tooth jump protection device (TJPD).

In the system layout of FIG. 2, the drive and driven shafts 103, 104 associated with the drive and driven sprockets 2, 6, respectively, are shown in a vertical orientation with the driven sprocket 6 on the bottom and the drive sprocket 2 on the top within a transfer case 107. A chain 8 connects the drive sprocket 2 to the driven sprocket 6. Between the drive sprocket 2 and the driven sprocket 6, the chain has a slack strand 8b and a tight strand 8a. As the transfer case approaches a vertical orientation, gravity encourages slack to build on the interface between the driven sprocket 6 and the chain 8 within the transfer case 107. Studies of the tooth jump and the slack of the chain in this system layout were conducted using a rigid guide or tooth jump protection device (TJPD) 120 placed at the entrance of the slack strand 8b meshing with the driven sprocket 6 at various radial offsets. Through the studies conducted, it was determined that the TJPD device 120 preferably needs to be positioned a distance radially away from the sprocket center to avoid interference with the chain's natural engagement with the sprocket. This positioning increases as the chain wears. The distance will vary depending on the system layout, chain design and point of life of the chain.

The TJPD 120 preferably provides a sufficient load to keep the chain 8 engaged on the driven sprocket 6, with the sufficient load based on stiffness requirements. The stiffness requirements of the TJPD 120 are dependent on application peak torque, radial offset of the TJPD 120, and chain type and design. As the applied torque increases, the required load from the TJPD 120 to maintain proper engagement also increases. As the chain 8 moves radially outward and deflects the TJPD 120, the required force from the TJPD 120 to maintain driven sprocket engagement increases. In terms of the chain type and design, links of the chain that have steeper flank pressure angles will require less force from the TJPD 120. It is noted that the TJPD 120 must be flexible enough to survive a catastrophic driven sprocket jump, in the event that the chain 8 was to wedge between the driven sprocket 6 and the TJPD 120.

FIG. 2 shows the transfer case in a vertical position, but the system can be orientated in any angle within the application. The TJPD 120 is located at the entrance of the driven sprocket 6. More specifically, the TJPD 120 is located at a position in which the chain 8 is tangent to the driven sprocket 6 at the first engagement of the driven sprocket 6 with the slack strand 8b of the chain 8 (e.g. the entrance of the chain 8 onto the driven sprocket 6).

In one embodiment, one-piece, fixed position TJPDs 130a, 130b are placed at the driven sprocket 6. The TJPD 130a, 130b are at the entrance and/or exit of the driven sprocket 6 regardless of the transfer case orientation angle. More specifically, TJPD 130a is located at a position in which the chain 8 is tangent to the driven sprocket 6 at the first engagement of the driven sprocket 6 with the slack strand 8b of the chain 8 (e.g. the entrance of the chain 8 onto the driven sprocket 6) and the TJPD 130b is located at a position in which the chain 8 is tangent to the driven sprocket 6 at the last engagement of the driven sprocket 6 with the tight strand 8a of the chain (e.g. the exit of the chain 8 from the driven sprocket 6).

The one-piece fixed position TJPD 130a, 130b has a body 131 which is produced from plastic, steel or aluminum and has a flat chain face 132 which interacts with the chain 8 that can include an elastomer coating. The one-piece fixed position TJPDs 130a, 130b can be a snubber which is bolted to the transfer case 107 relative to the chain 8 and the driven sprocket 6. The thickness of the elastomer coating can vary based on the chain and design layout. Furthermore, the body 131 and/or the thickness of the elastomer coating of the TJPDs 130a, 130b on opposite sides of the driven sprocket 6 can be the same or different.

Figure 4:
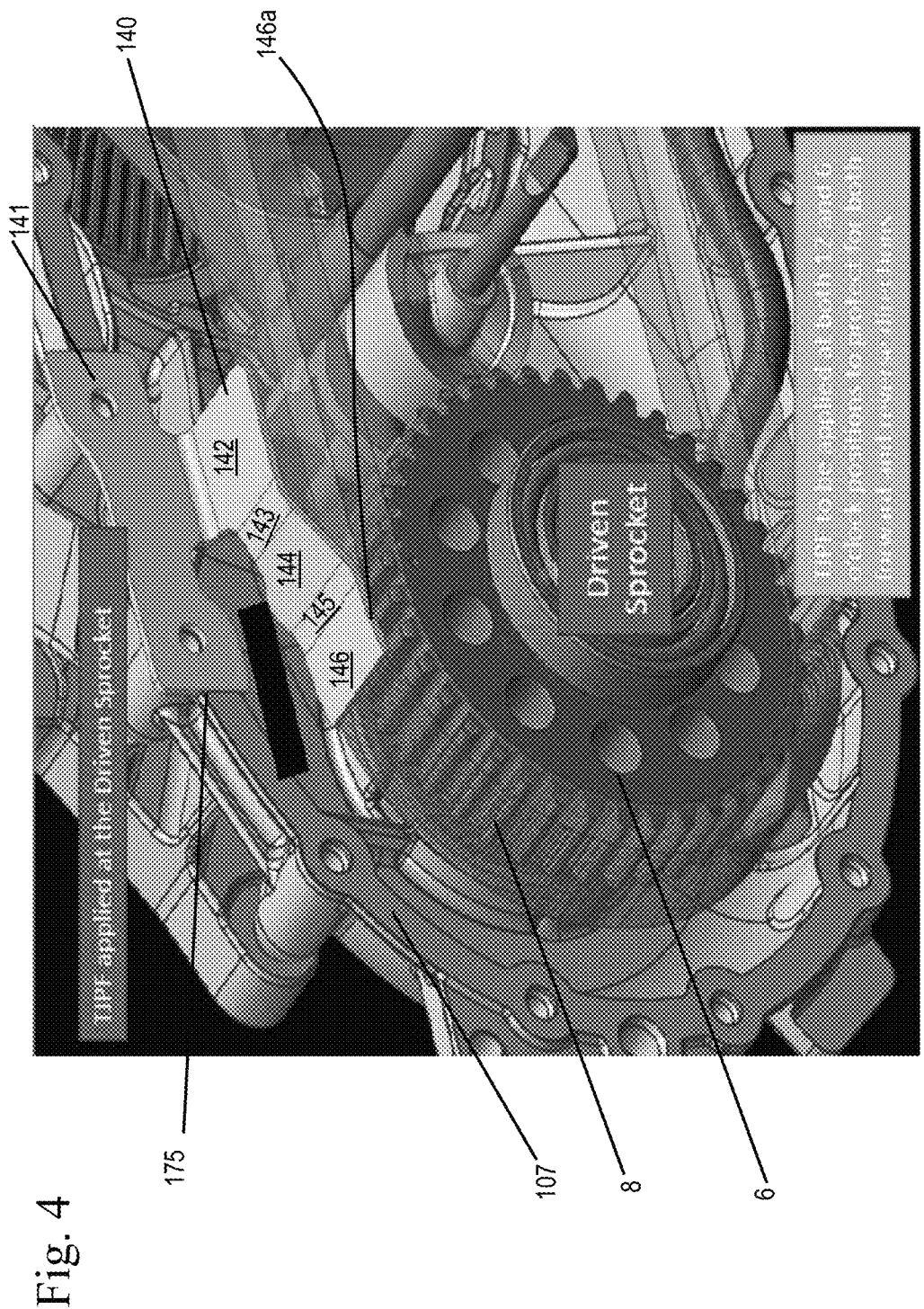
FIG. 4 shows a schematic of another embodiment of a TJPD.
Figure 5:
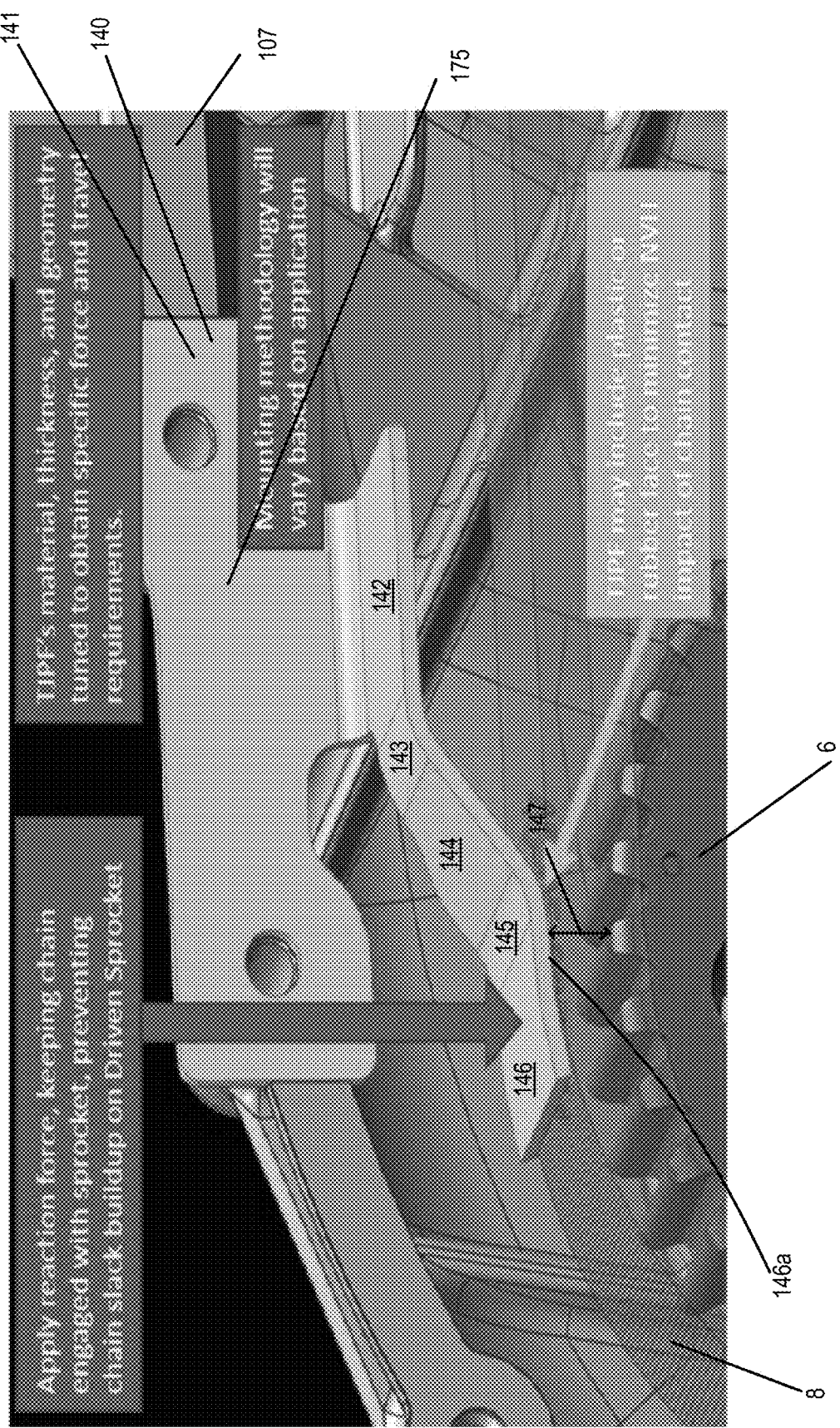
FIG. 5 shows a detailed view of the TJPD of FIG. 4.

FIGS. 4-5 show another embodiment of a TJPD 175 mounted to the transfer case 107 and adjacent the chain 8 and the driven sprocket 6. In this embodiment, the TJPD 175 is a an "L-shaped" one-piece multi-faceted ramp 140 with a mounting bracket 141. The mounting bracket 141 may be integrally formed with the multi-faceted ramp 140. In one embodiment, the mounting bracket 141 and the one-piece multi-faceted ramp 140 are formed from a single sheet of steel. The mounting bracket 141 is at approximately a 90 degree angle relative to a first flat face 142 of the multi-faceted ramp 140. In other words, the mounting bracket is the vertical portion of an "L" and the multi-faceted ramp 140 is the horizontal portion of the "L". The multi-faceted ramp 140 is preferably flexible and has a smooth contour.

The multi-faceted ramp 140 is comprised of a first flat surface 142 at approximately 90 degrees to the mounting bracket 141, a first transition portion 143, an angled portion 144, a second transition portion 145 and a second flat surface 146. The second flat surface 146 has a face 146a which is offset from the chain 8 by a small gap 147 when installed. As the chain 8 wears or elongates, the gap 147 decreases and contact between the chain 8 and the face 146a is possible during normal operation of the chain 8. As the chain 8 rotates, and a tooth jump occurs, the face 146a of the second flat surface 146 TJPD 175 applies a reaction force on the chain 8 to keep the chain 8 engaged with the driven sprocket 6 and to prevent chain slack buildup on the driven sprocket 6.

Alternatively, the multi-faceted ramp 140 can include offset flat planes with a cantilever between the offset flat planes. More specifically, the multi-faceted ramp 140 can include a first flat face 142, a second flat face 146 and an angled portion 144, without transition portions 143, 145. The angled ramp 144 is preferably flexible and has a smooth contour.

The face 146a can contain plastic or an elastomer face to minimize noise, vibration, and harshness (NVH) concerns and improve wear resistance of the TJPD 175. The TJPD 175 is preferably mounted such that the face 146a of the second flat surface 146 is placed at the driven sprocket 6 and/or the drive sprocket 2 along a diameter and located at the entrance and/or exit of the driven sprocket 6 or the driving sprocket 2 regardless of orientation angle of the transfer case. More specifically, at least a first TJPD 175 is located at a position in which the chain 8 is tangent to the driven sprocket 6 at the first engagement of the driven sprocket 6 with the slack strand 8b of the chain 8 (e.g. the entrance of the chain 8 onto the driven sprocket 6). A second TJPD 175 can be located at a position in which the chain 8 is tangent to the driven sprocket 6 at the last engagement of the driven sprocket 6 with the tight strand 8a of the chain (e.g. the exit of the chain 8 from the driven sprocket 6).

Figure 10:
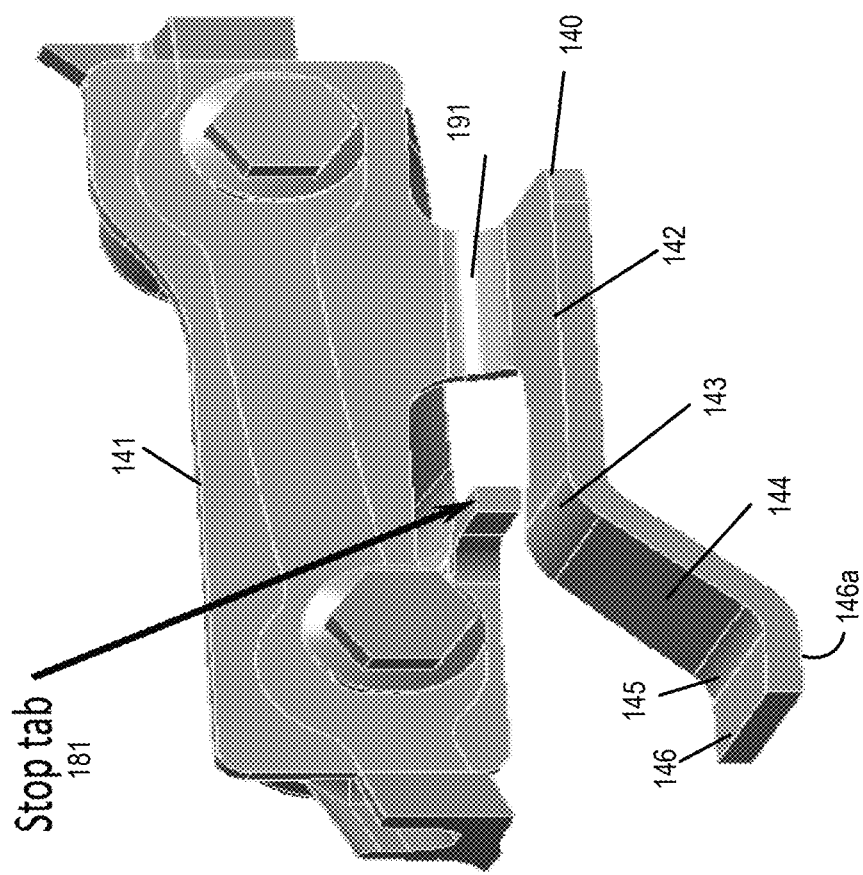
FIG. 10 shows another embodiment of a TJPD.

Alternatively, the TJPD 175 can include a stop 181 as shown in FIG. 10. In this embodiment, a stop 181 is mounted to the mounting bracket 141. The stop 181 is preferably placed adjacent the first transition portion 143 of the multi-faceted ramp 140. The stop 181 may be a tab or other such protrusion. The stop 181 may be integrally formed with the mounting bracket 141.

The addition of the stop 181 reduces bending of the entire multi-faceted ramp 140 at the point of connection 191 between the multi-faced ramp 140 and the bracket 141. Additionally, the stop 181 reduces bending at the first transition portion 143 so that stress on the multi-faceted ramp 140 is more evenly distributed.

Figure 6:
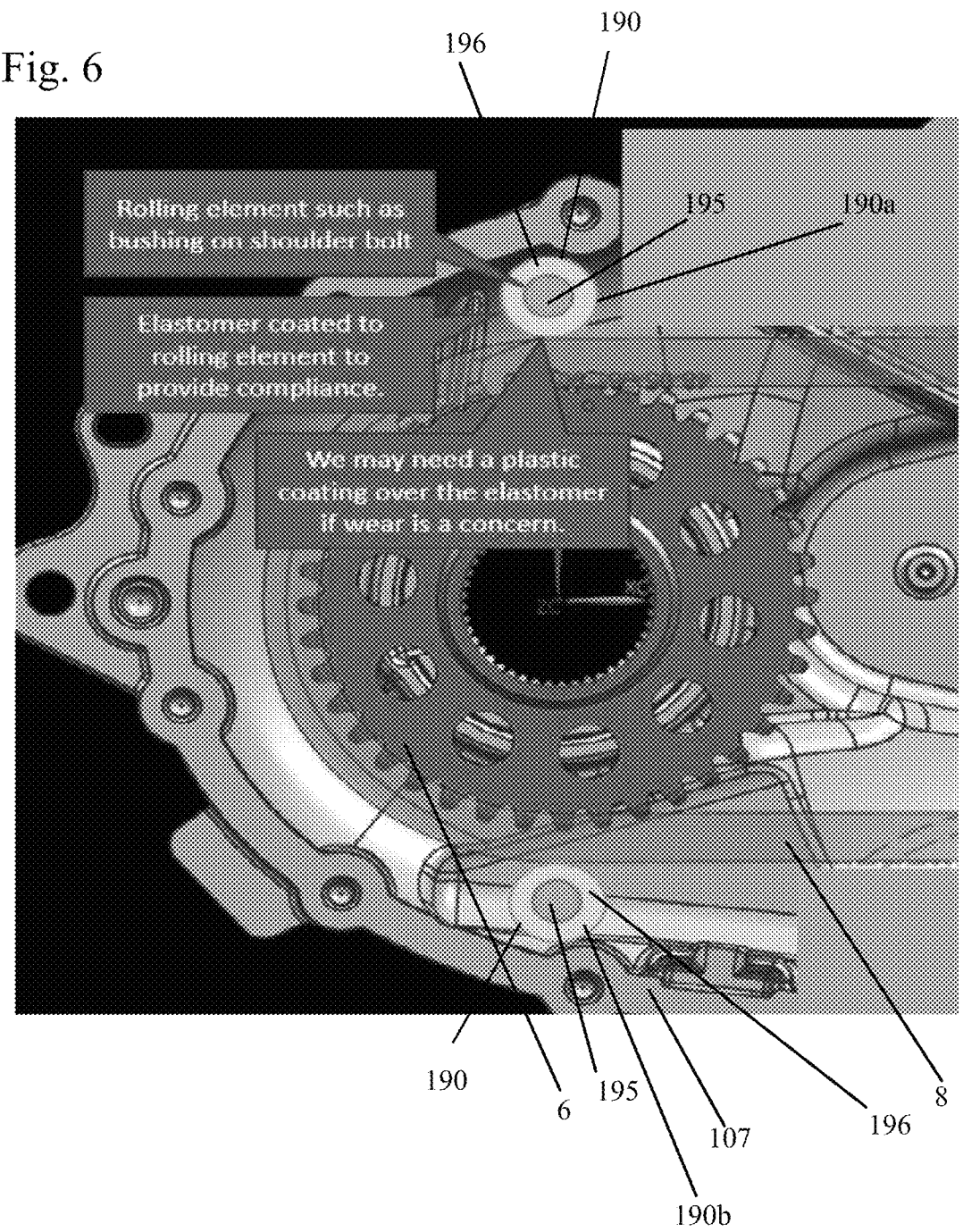
FIG. 6 shows a sectional view of a TJPD as a fixed position compliant roller within a transfer case.

FIG. 6 shows an embodiment in which the TJPD 190a, 190b is a fixed position roller. Each TJPD 190a, 190b includes a bolt 195 fixedly mounted to the transfer case 107. Surrounding and freely spinning on the bolt 195 is a rolling element 196. The rolling element 196 preferably has an elastomer coating.

The TJPDs 190a, 190b are placed at the driven sprocket 6. The TJPD 190a, 190b are at the entrance and/or exit of the driven sprocket regardless of the transfer case orientation angle. More specifically, TJPD 190a is located at a position in which the chain 8 is tangent to the driven sprocket 6 at the first engagement of the driven sprocket 6 with the slack strand 8b of the chain 8 (e.g. the entrance of the chain 8 onto the driven sprocket 6) and the TJPD 190b is located at a position in which the chain 8 is tangent to the driven sprocket 6 at the last engagement of the driven sprocket 6 with the tight strand 8a of the chain (e.g. the exit of the chain 8 from the driven sprocket 6).

Figure 7:
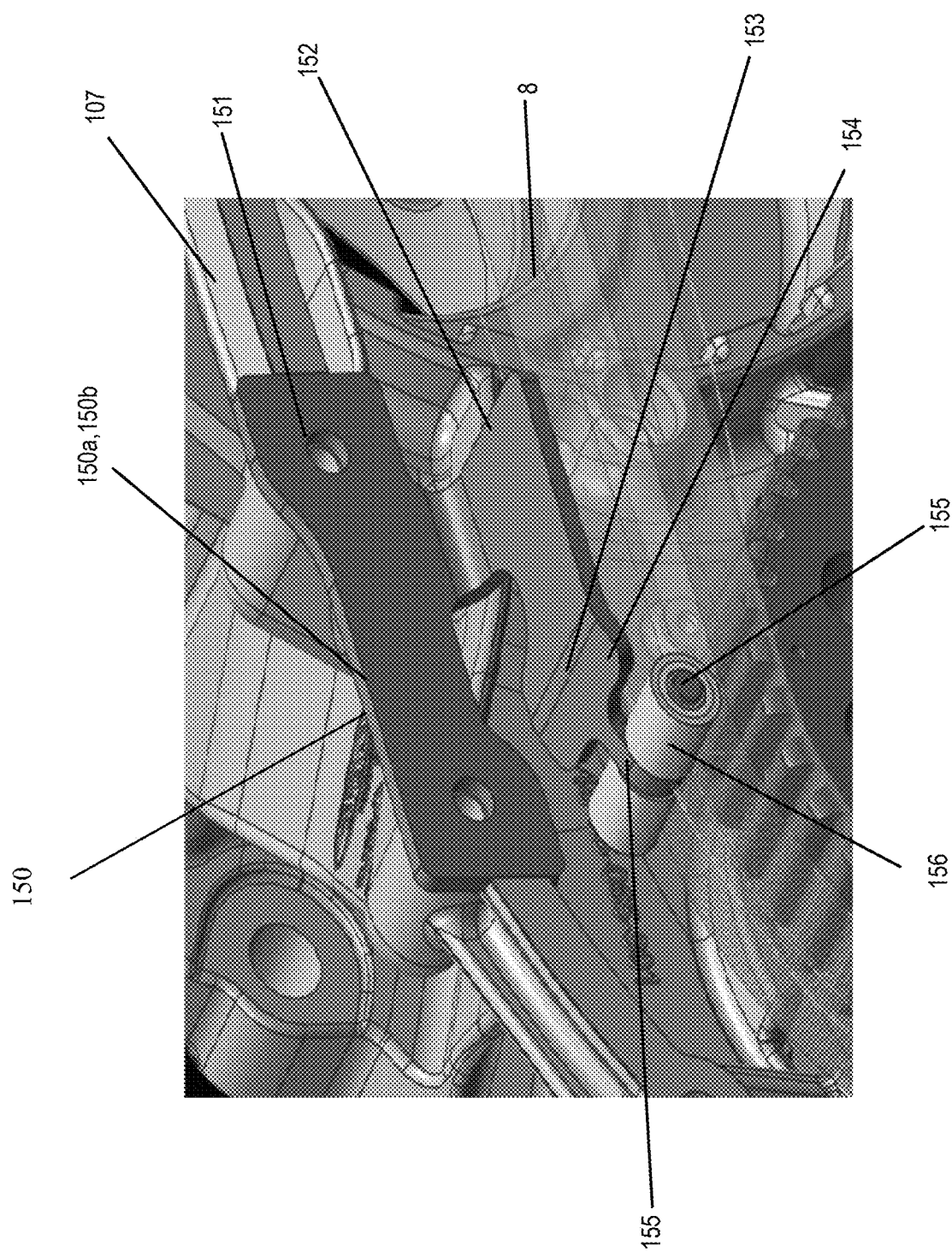
FIG. 7 shows a detailed view of a TJPD with a compliant roller.

FIG. 7 shows an embodiment in which the TJPD 180 is a ramped roller TJPD. The TJPD 180 is mounted within a transfer case 107 and adjacent the chain 8 and the driven sprocket 6.

The mounting brackets 151 are at approximately a 90 degree angle relative to a first flat face 152 which transitions to a first transition portion 153, an angled ramp 154 and to a compliant roller holder 155 which receives a compliant roller 156. In other words, the mounting bracket is the vertical portion of an "L" and the first transition portion 153 is the horizontal portion of the "L". The angle of the mounting of the bracket 151 relative to the compliant roller 156 may be any angle which both mounts the TJPD 150a, 150b to the transfer case 107 and allows the compliant roller 156 to engage with the chain 8.

The TJPD 180 is preferably mounted such that the face compliant rollers 156 are placed at the driven sprocket 6 and/or the drive sprocket 2 along a diameter and located at the entrance and/or exit of the driven sprocket 6 or the driving sprocket 2 regardless of orientation angle of the transfer case. More specifically, at least a first TJPD 180 is located at a position in which the chain 8 is tangent to the driven sprocket 6 at the first engagement of the driven sprocket 6 with the slack strand 8b of the chain 8 (e.g. the entrance of the chain 8 onto the driven sprocket 6). A second TJPD 180 can be located at a position in which the chain 8 is tangent to the driven sprocket 6 at the last engagement of the driven sprocket 6 with the tight strand 8a of the chain (e.g. the exit of the chain 8 from the driven sprocket 6).

The face compliant roller 156 may be made of plastic. Alternatively, the face compliant roller 156 may be made of plastic or other material and coated with an elastomer to reduce wear. The face compliant roller 156 can be a single roller mounted to the compliant roller holder 155 or multiple different rollers mounted on either side of the compliant roller holder 155 as shown in FIGS. 7 and 13.

Figure 13:
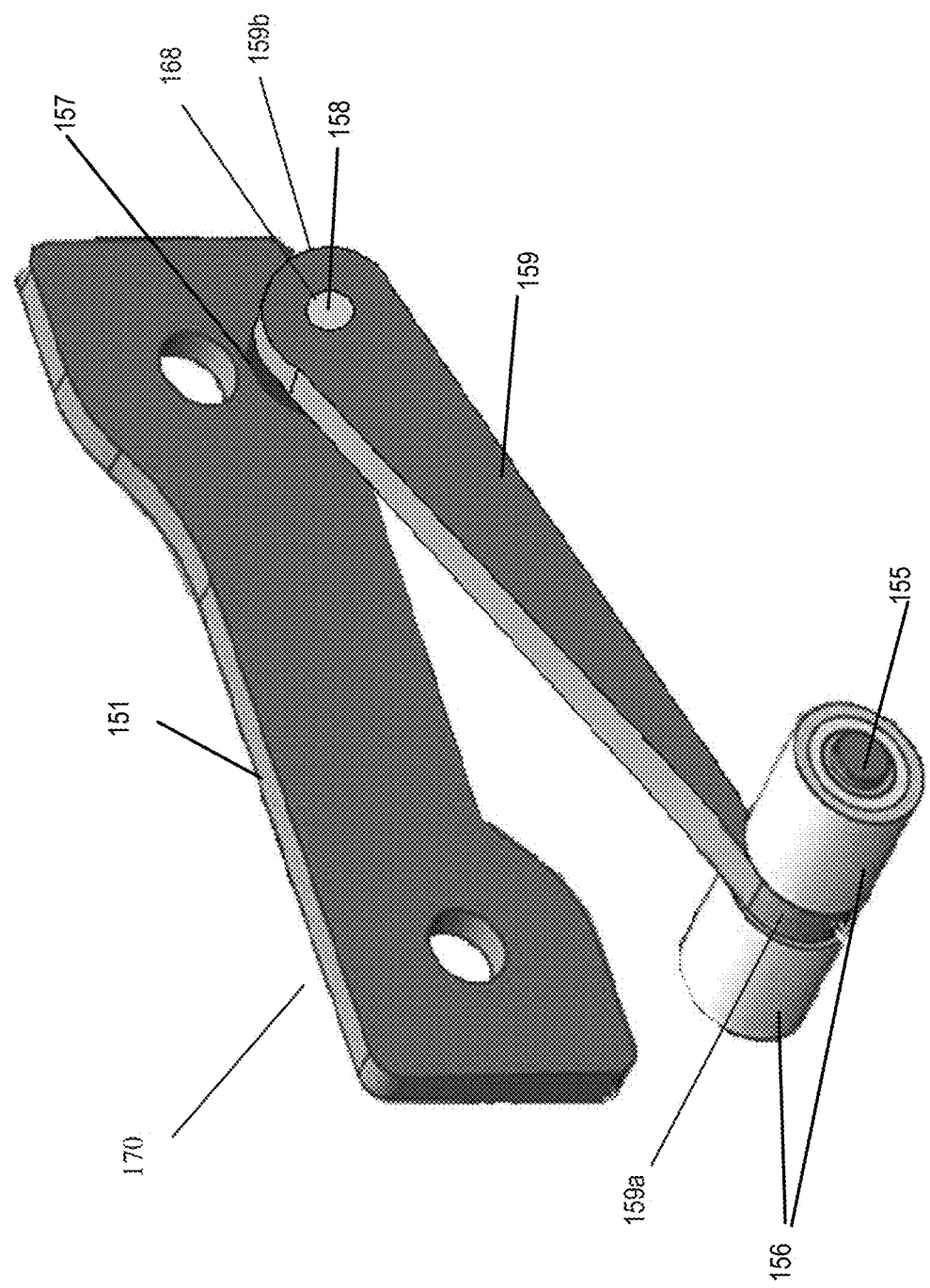
FIG. 13 shows a schematic of a TJPD of a compliant roller which is spring biased toward engagement with a chain.
Figure 14:
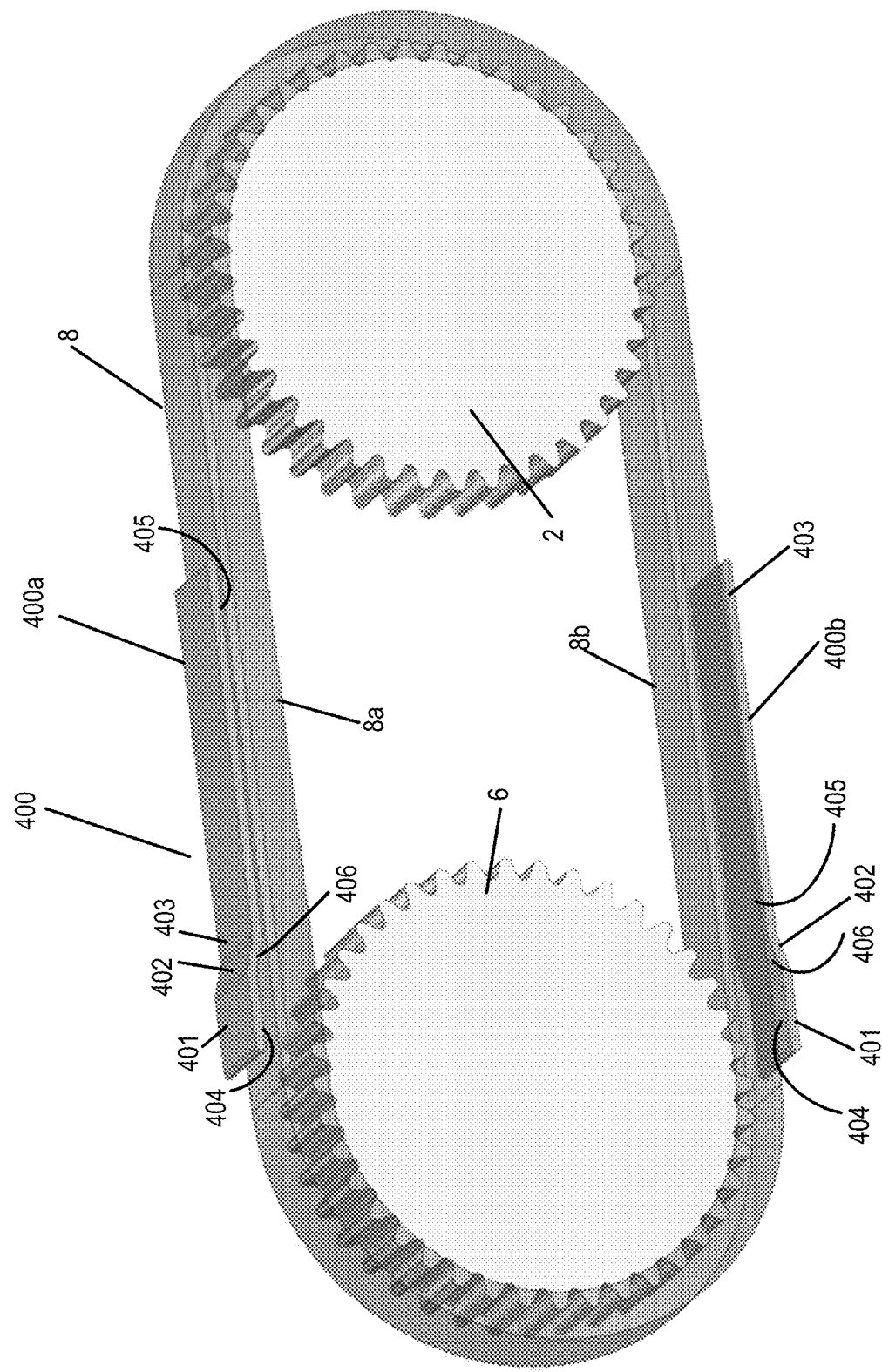
FIG. 14 shows a perspective view of a chain system with a TJPD of another embodiment on the slack and tight strand of the chain.
Figure 15:
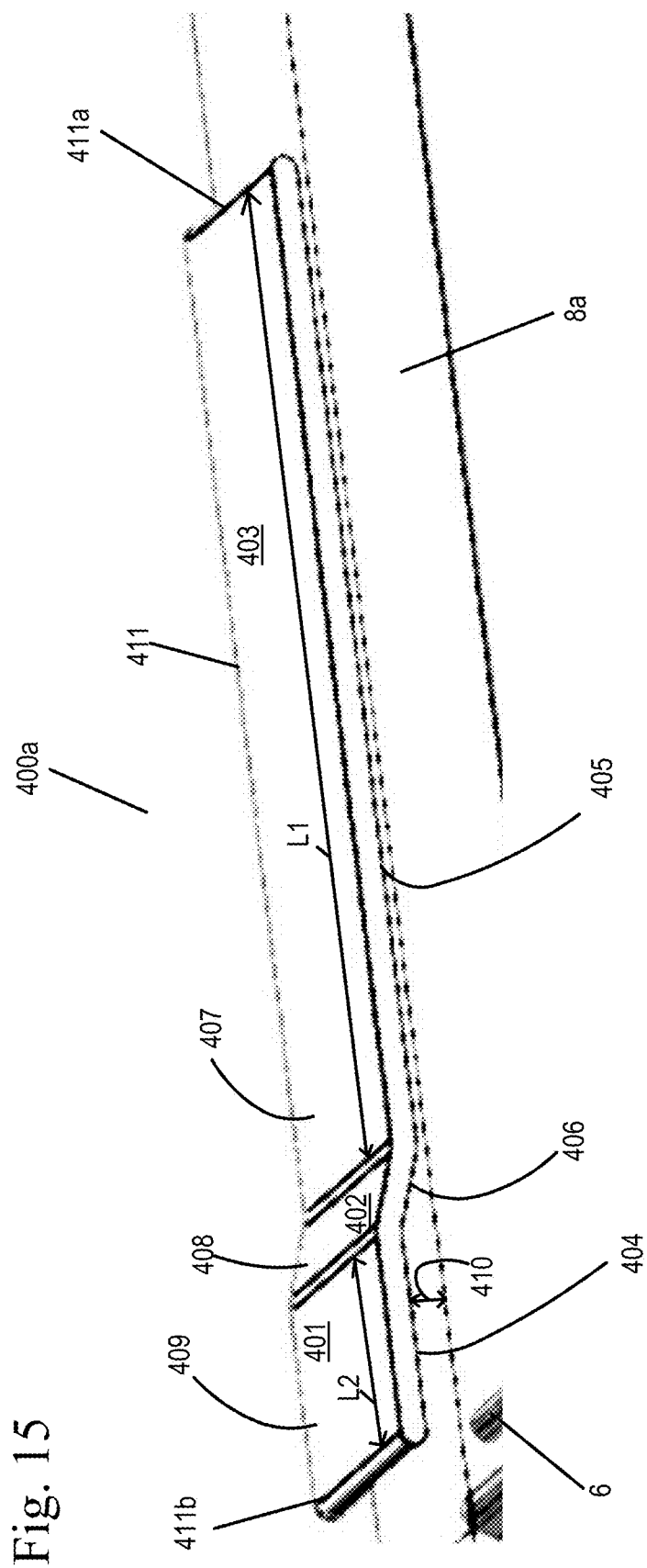
FIG. 15 shows a detailed perspective view of the tight strand of the chain with the TJPD of FIG. 14.
Figure 16:
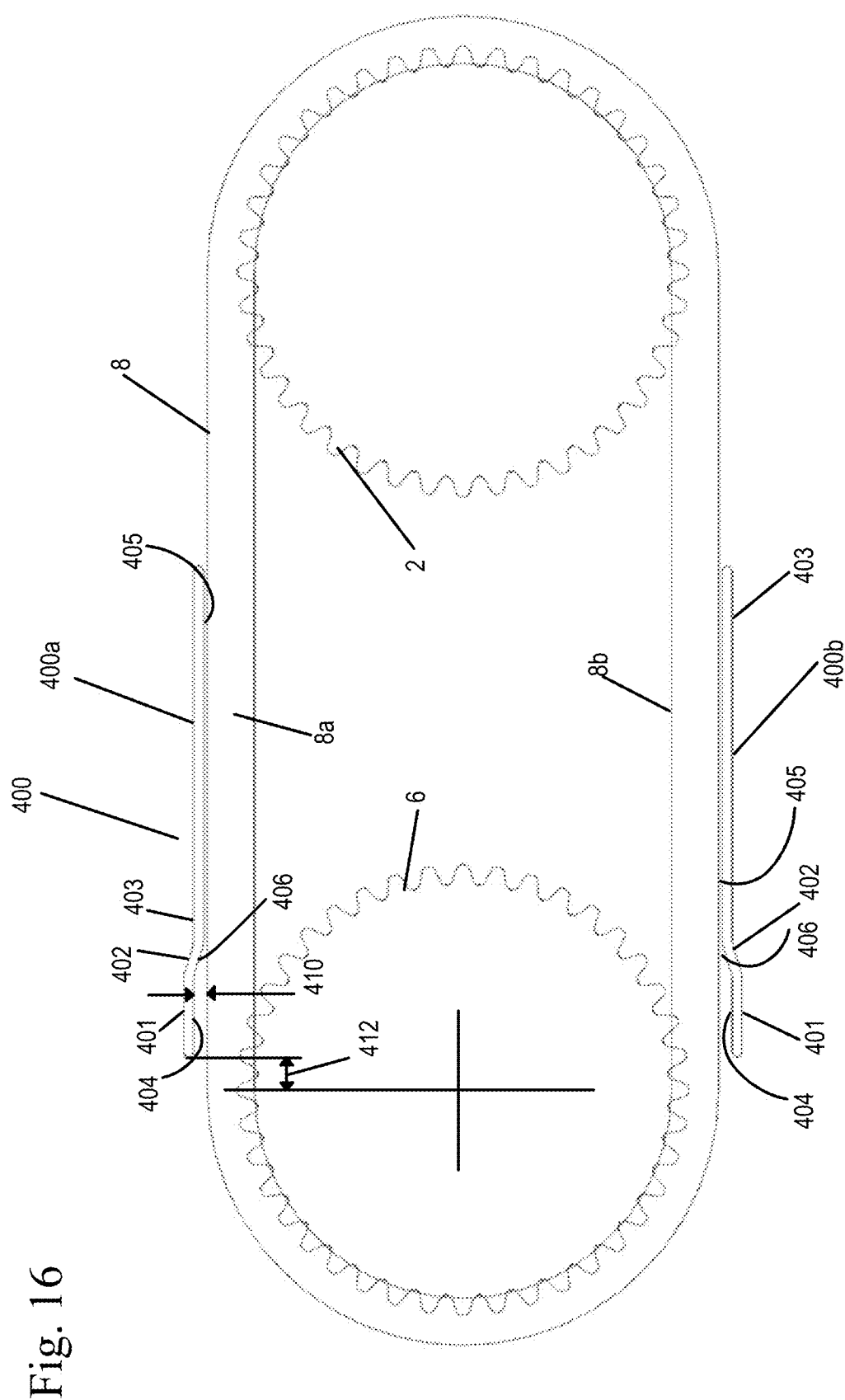
FIG. 16 shows a side view of the chain system of FIG. 14.
Figure 17:
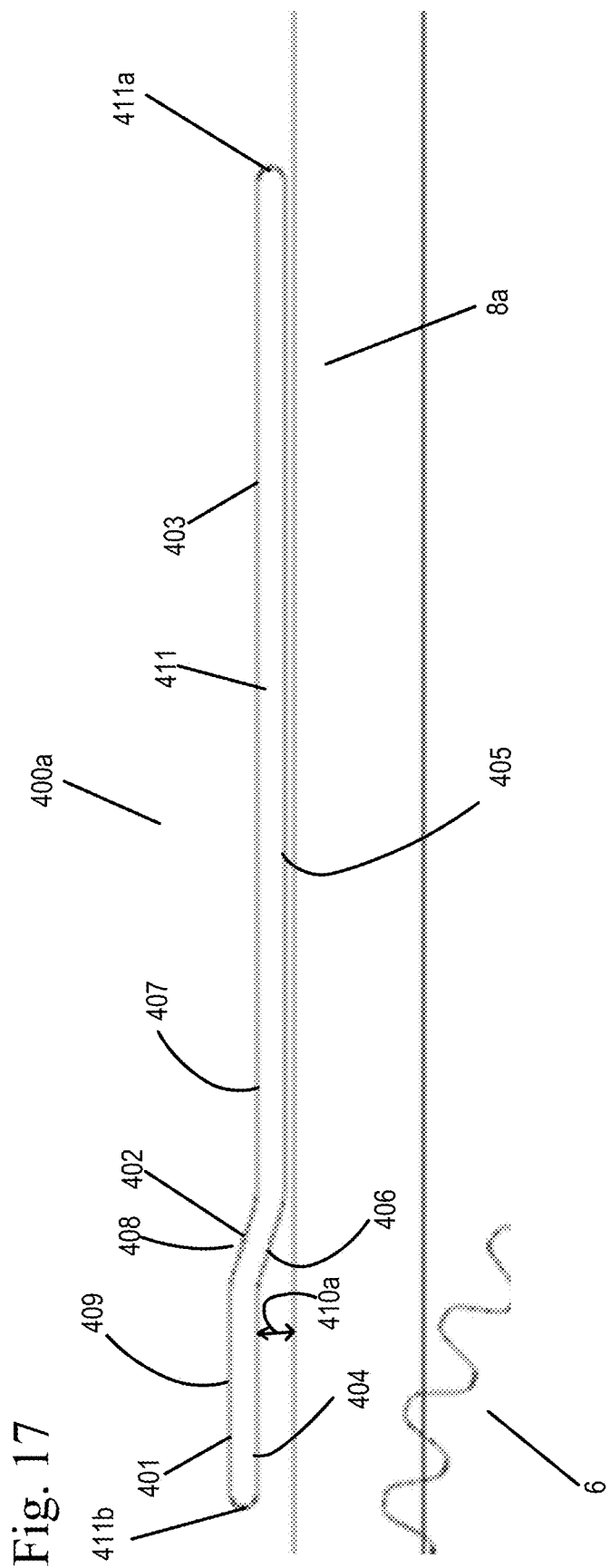
FIG. 17 shows a detailed side view of the tight strand of the chain with the TJPD of FIG. 14.

In an alternate embodiment, shown in FIG. 13, the TJPD 170 with face compliant roller 156 is spring 157 biased towards engagement with the chain 8 to further focus the accumulation of system slack at specific locations of the drive or driven sprocket 2, 6 to lower contact forces. The face compliant roller 156 is received on a compliant roller holder 155 which is integral with an arm 159. The face compliant roller 156 has a reduced amount of friction relative to the chain 8 in comparison to the chain sliding across a conventional tensioner arm.

The arm 159 is pivotably attached to the mounting bracket 151 via pivot pin 158 received within a pivot hole 168 of the arm 159 at a second end 159b of the arm 159 opposite of the compliant roller holder 155 at the first end 159a. The pivot pin 158 is mounted to the mounting bracket at a 90 degree angle. The arm 159 is preferably rigid.

A spring 157 is present between the first end 159a of the arm 159 and the bracket 151 to bias the arm 159 and thus the face compliant roller 156. The spring forces for each sprocket 2, 6 or the entrance and exit of the chain 8 from either of the driven sprocket 6 or the drive sprocket 2 may be different or the same. The spring 157 may be a torsional spring, a blade spring or other type of spring. The use of the spring 157 increases the compliance allowing for reduced contact forces. Furthermore, the spring 157 used can have a limited stroke range, such that in a first position, the spring 157 biases the face compliant roller 156 such that the face compliant roller 156 does not engage with the chain 8 and a clearance is present between the face compliant roller 156 and the chain 8. When the chain 8 contacts the face compliant roller 156 with enough force to overcome the preload of the spring, the face compliant roller 156 moves to a second position by rotating the arm 159 connected to compliant roller holder 155, such that the arm 159 pivots via pivot pin 158 relative to the mounting brocket 151. The spring preload is used to prevent tooth jump of the chain. The spring load is preferably tuned to the required force to prevent tooth jump and therefore reduce or prevent chain slack from building at the driven sprocket 6.

The TJPD 170 is preferably mounted such that the face compliant roller 156 is placed at the driven sprocket 6 and/or the drive sprocket 2 along a diameter and located at the entrance and/or exit of the driven sprocket 6 or the driving sprocket 2 regardless of orientation angle of the transfer case. More specifically, at least a first TJPD 170 is located at a position in which the chain 8 is tangent to the driven sprocket 6 at the first engagement of the driven sprocket 6 with the slack strand 8b of the chain 8 (e.g. the entrance of the chain 8 onto the driven sprocket 6). A second TJPD 170 can be located at a position in which the chain 8 is tangent to the driven sprocket 6 at the last engagement of the driven sprocket 6 with the tight strand 8a of the chain (e.g. the exit of the chain 8 from the driven sprocket 6).

FIGS. 8a-8b shows another embodiment of TJPD. In this embodiment, the TJPD is a biased snubber 160. The biased snubber 160 is mounted to the drivetrain transfer case 107. The biased snubber 160 has a body 161 with a first end 162, a second end 163 opposite the first end 162 with a length L between the first end 162 and the second end 163, a snubber face 164, and a second face 165, opposite the snubber face 164. Along the snubber face 164 an intended angle α (alpha) is present between the first end 162 and the second end 163 relative to a straight line 193 extending from the first end 162 to the second end 163 and parallel to the snubber face 164. The intended angle α is between 0-5 degrees and more preferably, greater than 0 degrees.

The biased snubber 160 creates an intended angle α between the path of the chain 8 and snubber face 164, such that an intended angle α is present between the chain path and the snubber face 164. The snubber face 164 is shaped such that the snubber face 164 is closer to the chain 8 near the driven sprocket 6 as compared to the driving sprocket 2. The intended a angle forces the chain slack to accumulate near the chain exit of the driving sprocket 2 as indicated by reference number 32. The biased snubber 160 is fully outside of the chain path when the tension is applied to the adjacent chain strand as shown in FIG. 8a.

When tension is applied to the opposite chain strand, slack will accumulate on the chain strand adjacent to the biased snubber 160 and the intended angle α (alpha) of the biased snubber 160 forces the excess chain to accumulate in a known location that improves tooth jump as shown in FIG. 8b. Therefore, slack accumulation is present only near the drive sprocket 2 and can be used to control chain slack within a transfer case, such that the chain slack only builds on the drive sprocket 2 resulting in a higher jump torque. A higher jump torque capability allows for reduced chain width.

It is noted that the biased snubber 160 can also be mounted a targeted distance relative to the driven sprocket and within a targeted or specific chain-to-snubber gap to prevent slack accumulation relative to the driven sprocket 6 and force slack accumulation near the drive sprocket 2 as described below relative to FIGS. 11a-11b.

Figure 11A:
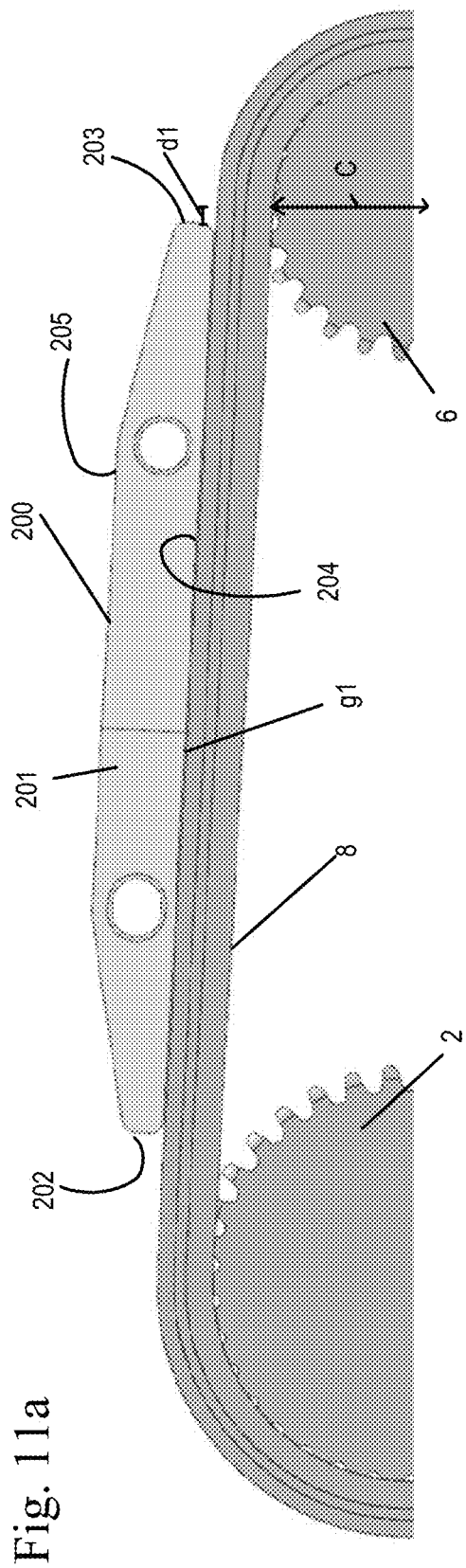
FIG. 11a shows a schematic of snubber placed at a specific distance relative to the driven sprocket and a specific gap relative to the chain.
Figure 11B:
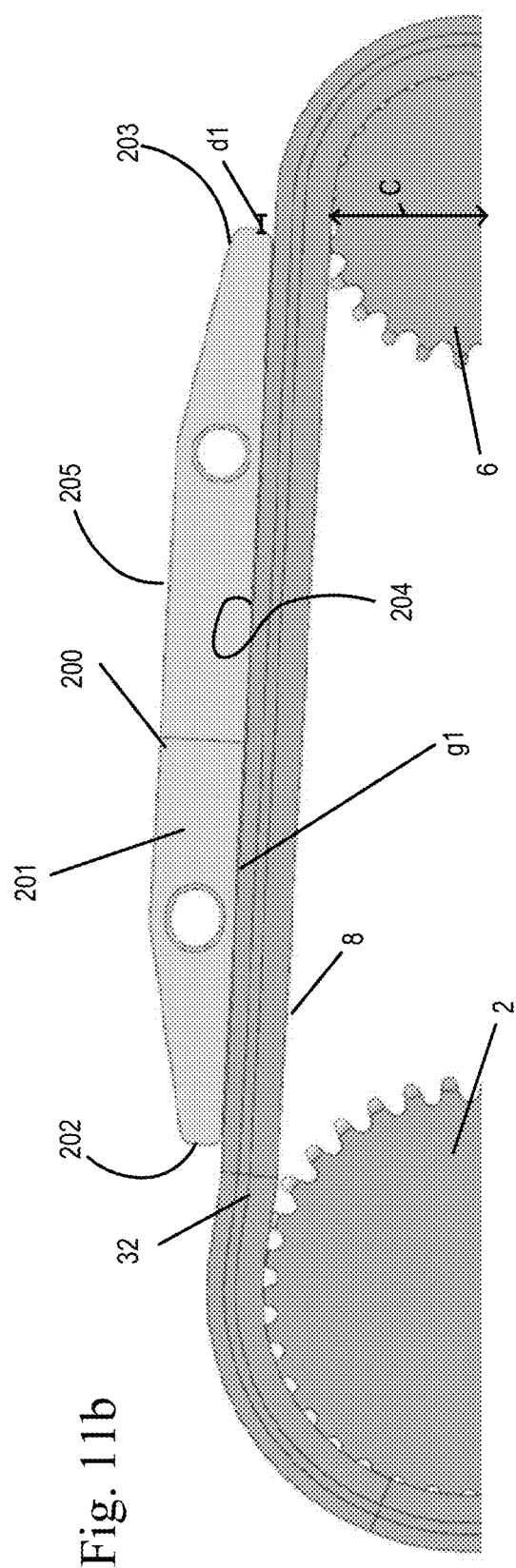

FIGS. 11a-11b show an embodiment of a TJPD of a snubber 200 that is placed at a specific or targeted distance relative to the driven sprocket 6 and within a targeted or specific chain-to-snubber gap to prevent slack accumulation relative to the driven sprocket 6 and force slack accumulation near the drive sprocket 2. The snubber 200 has a body 201 with a first end 202 and a second end 203 and a first face 205 and a second face 204. The second face 204 is adjacent the chain 8. Optionally, the second face 204 can include a pad or elastomeric surface to reduce noise vibration harshness (NVH) concerns. The snubber's location is positioned a gap distance g1 away from the chain and biased a distance d1 away from the driven sprocket 6. These distances g1, d1 are determined by the mounting location of the chain 8 and the sprockets 2, 6 relative to the transfer case 107.

The snubber 200 is placed between the driven sprocket 6 and the drive sprocket 2 at a specific distance d1 from a centerline C of the driven sprocket 6 and also at a specific gap distance g1 between the second face 204 and the chain 8. In one example, the gap distance g1 between the chain 8 and the snubber 200 is in a range between 0-7 mm. In another embodiment, the range can be 0-1 mm. In another embodiment, the range can be 0-2 mm. In yet another example, the gap distance g1 is 0.5 mm or less. By setting a gap distance between the chain 8 and the snubber 200, the contact forces and wear of the snubber 200 decreases. Using chain pitch lengths, the distance d1 could be approximately two chain pitch lengths. For example, a 9.525 mm pitch chain, d1 would be approximately 19 mm. For a 11.039 mm pitch chain, the distance d1 would be approximately 22 mm.

When tension is applied to the opposite chain strand from which the snubber 200 is adjacent, slack will accumulate on the chain strand adjacent to the snubber 200 due to the gap distance g1 and the distance d1 forcing the excess chain to accumulate in a known location near the drive sprocket 2 resulting in a higher jump torque. The higher jump torque capability allows for reduced chain width to be used.

Figure 9:
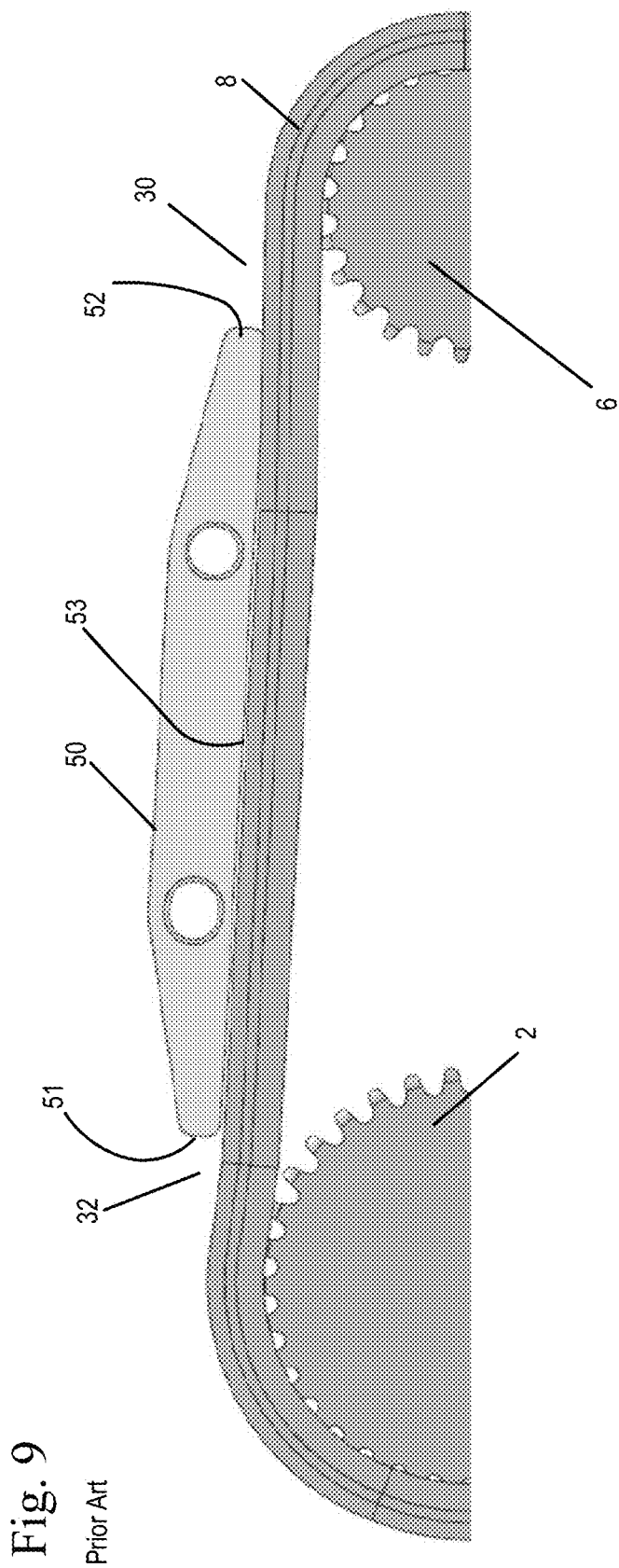
FIG. 9 shows a prior art snubber engaged with a chain.

FIG. 9 shows a conventional or traditional snubber. The traditional snubber 50 does not have an angle and instead is straight or approximately 180 degrees between the first end 51 and the second end 52 across the length, such that the entire snubber face 53 interacts with the chain strand 8 and a minor gap of approximately 0.1 mm is present between the traditional snubber 50 and the chain. Slack accumulates near the drive sprocket 2 at the position indicated by reference number 32 as well as near the driven sprocket 6 indicated by reference number 30. Therefore, slack is permitted to accumulate near both the drive sprocket 2 and the driven sprocket 6, and tooth jump may occur on either sprocket.

Figure 12:
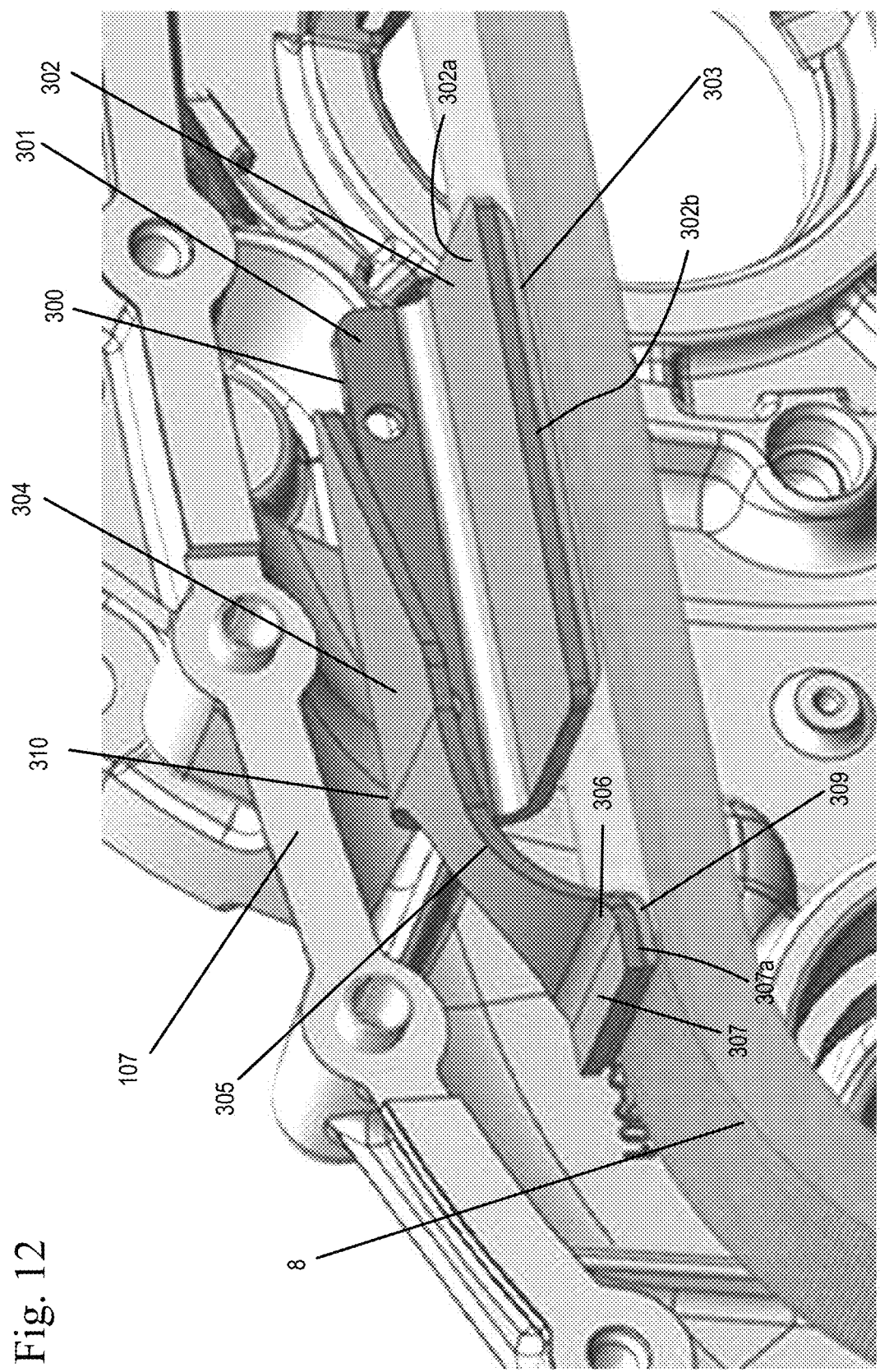
FIG. 12 shows a view of a TJPD with a snubber mounted within a transfer case.

FIG. 12 shows a TJPD 300 mounted to the transfer case 107 and situated adjacent the chain 8 and the driven sprocket 6. In this embodiment, the TJPD 300 is a one-piece multi-faceted ramp 310 with a mounting bracket 301 and snubber 302.

The mounting bracket 301 may be integrally formed with the multi-faceted ramp 310. Additionally, the mounting bracket 301 may be integrally formed with snubber 302.

The snubber 302 has a first flat face 302a and a second, opposite flat face 302b adjacent the chain 8. Attached to the second flat face 302b is a pad or elastomer pad 303. The pad 303 contacts the chain 8.

Also attached to the mounting bracket 301 is a multi-faceted ramp 310. The multi-faceted ramp 310 has a first body portion 304 with a flat face connected to the mounting bracket 301 and a ramped second body portion 305. The ramped second body portion 305 is connected to a first transition ramp 306, which is connected to a first flat surface 307. Attached to a face 307a of the first flat surface 307 is a pad or elastomer face 309.

The pad 309 is offset from the chain 8 by a small gap when installed. For example, the gap between the pad 309 and the chain 8 is between 0.5-1.5 mm. As the chain 8 wears or elongates, the gap decreases and contact between the chain 8 and the pad 309 is possible during normal operation of the chain 8. As the chain 8 rotates, and a tooth jump occurs, the pad 309 of the TJPD 300 applies a reaction force on the chain 8 to keep the chain 8 engaged with the driven sprocket 6 and to prevent chain slack buildup on the driven sprocket 6. The pad 303 maintains contact with the chain 8 during normal operation of the chain. The pad 303 acts like a snubber to attenuate chain resonance and contacts the chain when the chain enters a resonance condition.

The TJPD 300 is preferably mounted such that the pad 309 of the multi-faceted ramp 310 is placed at the driven sprocket 6 or the drive sprocket 2 along a diameter of the driven sprocket 6 or the drive sprocket 2 and located at the entrance and/or exit of the driven sprocket regardless of the transfer case orientation angle.

More specifically, at least a first TJPD 300 is located at a position in which the chain 8 is tangent to the driven sprocket 6 at the first engagement of the driven sprocket 6 with the slack strand 8b of the chain 8 (e.g. the entrance of the chain 8 onto the driven sprocket 6). A second TJPD 300 can be located at a position in which the chain 8 is tangent to the driven sprocket 6 at the last engagement of the driven sprocket 6 with the tight strand 8a of the chain (e.g. the exit of the chain 8 from the driven sprocket 6).

In one embodiment, the mounting bracket 301 and the snubber 302 are formed from a single sheet of steel. The mounting bracket 301 is at approximately a 90 degree angle relative to a first flat face 302a of the snubber 302.

The snubber 302 of the TJPD 300 provides an additional reduction of noise vibration and harshness (NVH) to reduce by controlling strand resonance associated with the chain system, while the multi-faceted ramp 310 of the TJPD 300 limits slack accumulation on the driven sprocket 6.

FIGS. 14-18 show a TJPD 400 of another embodiment.

Fixed position TJPDs 400a, 400b are placed at the driven sprocket 6. The TJPD 400a, 400b are at the entrance and/or exit of the driven sprocket 6 regardless of the transfer case orientation angle. More specifically, a first tooth jump protection device 400a is mounted between the driven sprocket 6 and the drive sprocket 2 on the slack strand 8b of the chain 8, with the first tooth jump protection device 400a installed within the chain drive system at a distance 412 defined between a centerline C-C of the driven sprocket 6 and a first end 411a of the first tooth jump protection device 400a or the chain tangency and defining a gap distance 410 between the at least first tooth jump protection device 400a and the slack strand of the chain 8. The second tooth jump protection device 400b is mounted between the driven sprocket 6 and the drive sprocket 2 on the slack strand 8b of the chain 8, with the second tooth jump protection device 400b installed within the chain drive system at a distance 412 defined between a centerline C-C of the driven sprocket 6 and a first end 411a of the second tooth jump protection device 400b or the chain tangency and defining a gap distance 412 between the at least second tooth jump protection device 400b and the tight strand 8a of the chain 8.

Figure 19:
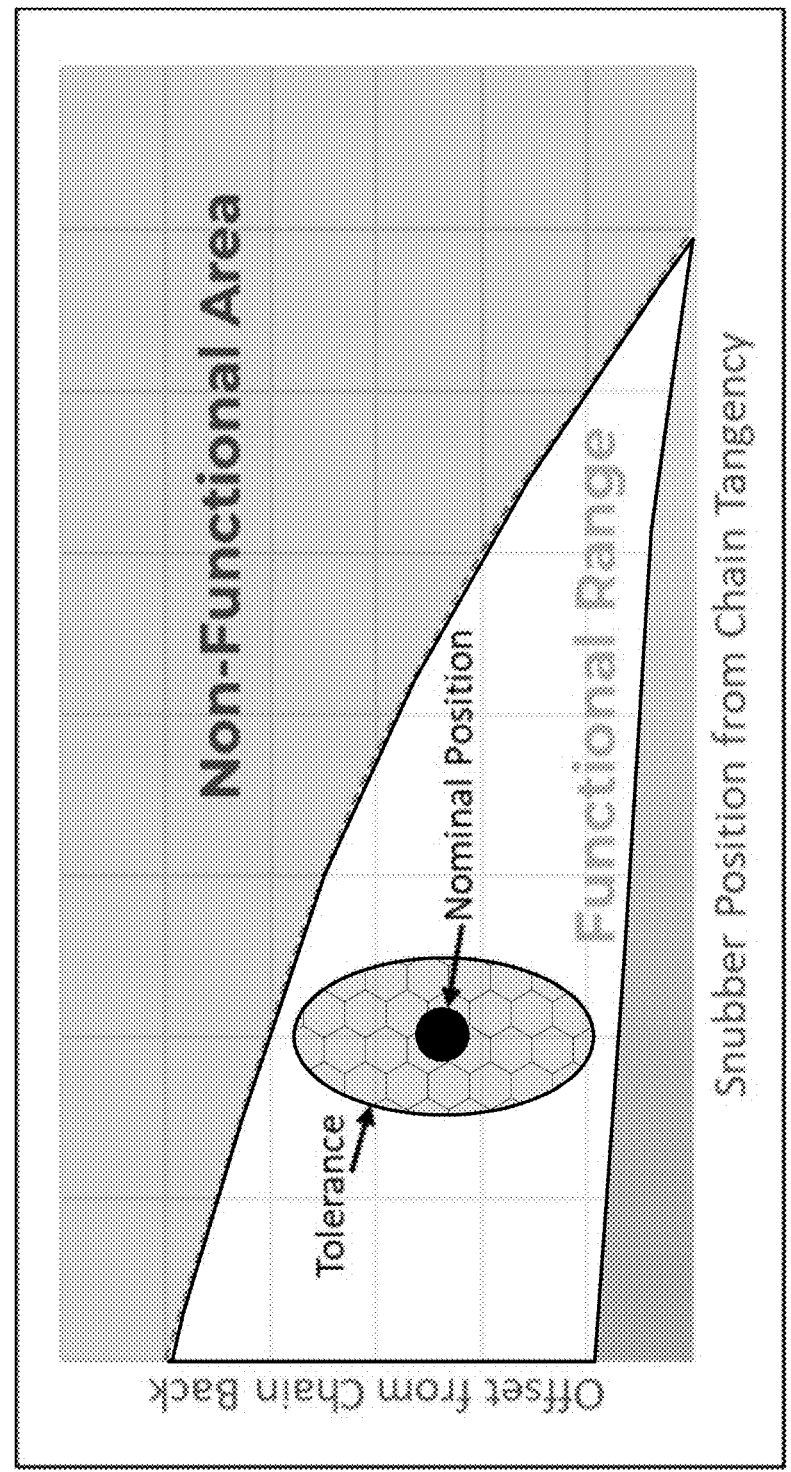
FIG. 19 shows a graph of offset from the chain back versus snubber position from chain tangency.

FIG. 19 shows a graph of offset from the chain back versus snubber position from chain tangency. The gap distance 410 is shown as the offset distance from the chain back. The distance defined between the centerline C-C of the driven sprocket 6 and a first end 411a of the tooth jump protection devices 400a, 400b or the chain tangency is shown as the snubber position from chain tangency. The nominal position shows a targeted placement with the tolerance band (indicated by hexagons) showing the possible assembly variation within the functional range. The non-functional range is indicated by the light gray section of the graph.

Therefore, TJPD 400b is located at a position in which the chain 8 is tangent to the driven sprocket 6 at the first engagement of the driven sprocket 6 with the slack strand 8b of the chain 8 (e.g. the entrance of the chain 8 onto the driven sprocket 6) and the TJPD 400a is located at a position in which the chain 8 is tangent to the driven sprocket 6 at the last engagement of the driven sprocket 6 with the tight strand 8a of the chain (e.g. the exit of the chain 8 from the driven sprocket 6).

The TJPD 400a, 400b are preferably the same and have the same features. The TJPD 400a, 400b are preferably made of a single sheet of steel, although other materials may be used. The TJPD 400a, 400b each have a body 411 with a first end 411a and a second end 411b.

Between the first end 411a and the second end 411b is a first flat member 403 of a length L1 connected to an angled ramp 402 and a second flat member 401 of a length L2. The length of L1 is preferably greater than length L2. The second flat member 401 being closest to the position in which the chain 8 is tangent to the driven sprocket 6 at the last engagement of the driven sprocket 6 with the tight strand 8a or the slack strand 8b of the chain (e.g. the entrance and exit of the chain 8 from the driven sprocket 6).

The first flat member 403 has a first surface 407 and a second surface 405. The second surface 405 is adjacent to the chain 8 and preferably contacts the chain 8. The gap present between the second surface 405 of the first flat member 403 and the chain is preferably less than 1 mm. The second surface 405 controls strand resonance of the chain 8.

The angled ramp 402 has a first surface 408 and a second surface 406. The second surface 406 of the angled ramp 402 is adjacent to the chain 8, but preferably does not contact the chain 8.

The second flat member 401 has a first surface 409 and a second surface 404. The second surface 404 is separated from the chain 8 by a gap distance 410 when installed. The second surface 404 controls the chain slack based on the distance from the entrance and exit of the chain from the driven sprocket 6. As the chain 8 wears or elongates, the gap distance 410 decreases and contact between the chain 8 and the second surface 404 of the second flat member 401 is possible during normal operation of the chain 8. A distance 410 is present between the first surface 409 of the second flat member 401 and the chain 8.

As the chain 8 rotates, and a tooth jump occurs, the second surface 404 of the second flat member 401 applies a reaction force on the chain 8 to keep the chain 8 engaged with the driven sprocket 6 and to prevent chain slack buildup on the driven sprocket 6. It is noted that the second surfaces 404, 405, 406 of the second flat member 401, the first flat member 403 and the angled ramp 402 form a stepped face relative to the chain 8.

Figure 18:
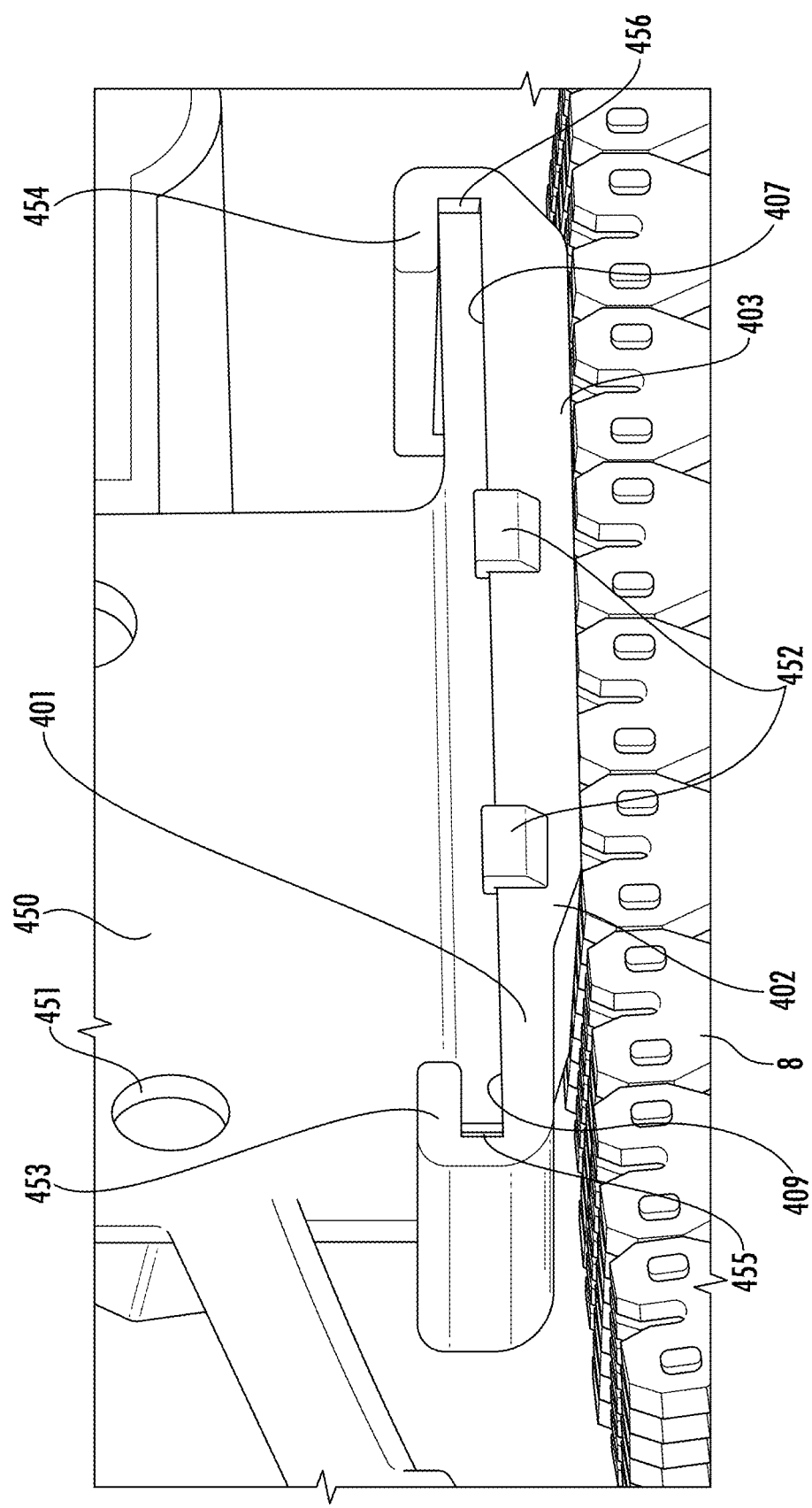
FIG. 18 shows the TJPD of FIG. 14 mounted to the transfer case.

In one embodiment, the TJPD 400a, 400b is a plastic or elastomer face which is fixed to the transfer case by a L-shaped bracket 450 with bolt holes 451. The TJPD 400a, 400b is fixed to the transfer case by mounting bosses 452 as shown in FIG. 18. Additionally, the first end 411a and the second end 411b can each have a flange 453, 454. The flange 453 at the second end 411b forms a cavity 455 with the first surface 409 of the second flat member 401 for receiving a portion of the L-shaped bracket 450. The flange 454 at the first end 411a forms a cavity 456 with the first surface 407 of the first flat member 403 for receiving a portion of the L-shaped bracket 450.

In one embodiment, the distance of the gap 410 is less than 1, and the distance 412 between the sprocket tangency and the first end of the TJPD 400a, 400b is less than 3 pitch lengths of the chain. In this embodiment, the TDPD 400a, 400b provides control of the strand resonance of the chain 8.

In another embodiment, the distance of the gap 410 is between 1-7 mm and the distance 412 between the sprocket tangency and the first end of the TJPD 400a, 400b is less than the distance of the gap 410. As the distance of the gap 410 increases, the distance 412 between the sprocket tangency and the first end of the TJPD 400a, 400b decreases.

In another embodiment, the distance of the gap 410 is 1.5 mm and the distance 412 between the sprocket tangency and the first end of the TJPD 400a, 400b is equivalent to 1 pitch length of the chain 8.

While two TJPD 130, 150, 160, 170, 175, 180, 190, 200, 300, 400 are shown on either side of the driven sprocket 6, a single TJPD may be placed a specific or targeted distance relative to the driven sprocket 6.

In another embodiment, either a single TJPD or two TJPD can be shown on either side of a driving sprocket 2 to force slack accumulation to occur on the driven sprocket 6.

While not shown, in an alternate embodiment, the two TJPD devices mounted along a diameter of the driven sprocket and/or driving sprocket can be different devices. Any combination of TJPDs disclosed within the application can be present on the entrance and exit of the chain from the driven sprocket 6. Therefore, the first TJPD at the first engagement of the driven sprocket 6 with the slack strand 8b of the chain 8 (e.g. the entrance of the chain 8 onto the driven sprocket 6) can be the same or different than a second TJPD located at a position in which the chain 8 is tangent to the driven sprocket 6 at the last engagement of the driven sprocket 6 with the tight strand 8*a* of the chain (e.g. the exit of the chain 8 from the driven sprocket 6).

For example, one piece fixed position TJPD 130 may be mounted at the first engagement of the driven sprocket 6 with the slack strand 8*b* of the chain 8 (e.g. the entrance of the chain 8 onto the driven sprocket 6) and a second TJPD may be a L-shaped one piece multi-faceted ramp TJPD 140 mounted at the last engagement of the driven sprocket 6 with the tight strand 8*a* of the chain. In another example, the fixed position compliant roller TJPD 150 can be mounted at the first engagement of the driven sprocket 6 with the slack strand 8*b* of the chain 8 (e.g. the entrance of the chain 8 onto the driven sprocket 6) and a second TJPD may be a snubber TJPD 300, mounted at the last engagement of the driven sprocket 6 with the tight strand 8*a* of the chain. The examples above are not limiting, and other combinations are possible.

Furthermore, along the chain spans between the driven and driving sprockets, the TJPDs which are mounted on opposite chain strands can also differ. For example, one the TJPD can be a biased snubber TJPD 160 and the opposite TJPD mounted relative to the opposite chain strand is snubber TJPD 200. The examples above are not limiting, and other combinations are possible.

In yet another embodiment, a single TJPD 130, 140, 150, 160, 170, 180, 190, 300, 400 can be placed at the entrance of the slack strand 8*b* meshing with the driven sprocket 6.

In yet another embodiment, a single TJPD 160, 200 is placed relative to one of the strands 8*a*, 8*b* of the chain 8.

In another embodiment, when the transfer case is installed in a horizontal position, the opposite midpoints correspond to a 12 o'clock and 6 o'clock position along a central diameter of the driven sprocket 6 and/or the drive sprocket 2. The TJPDs of the above embodiments are installed at the opposite midpoints of the driven sprocket 6 and/or the drive sprocket 2.

In another embodiment, when the transfer case is installed in a vertical position, the opposite midpoints correspond to at the 3 o'clock and the 9 o'clock of the driven sprocket 6 and/or the drive sprocket 2. The TJPDs of the above embodiments are installed at the opposite midpoints of the driven sprocket 6 and/or the drive sprocket 2.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A chain drive system in a transfer case, the chain drive system comprising:
    a drive sprocket;
    a driven sprocket;
    a chain connecting the drive sprocket to the driven sprocket, the chain having a slack strand between the driven sprocket and the drive sprocket and a tight strand between the driven sprocket and the drive sprocket; and
    at least a first tooth jump protection device mounted between the driven sprocket and the drive sprocket on the slack strand of the chain, with the first tooth jump protection device installed within the chain drive system at a distance defined between a centerline of the driven sprocket and a first end of the first tooth jump protection device and defining a gap distance between the at least first tooth jump protection device and the slack strand of the chain;
    wherein the first tooth jump protection device comprises a first tooth jump protection device snubber having a body with the first end and a second end separated by a length, the body comprising a first flat member at the first end, a second flat member at the second end and an angled ramp connecting the first flat member to the second member, the first flat member having a first flat member surface for contacting the slack strand of the chain and a second flat member surface of the second flat member defining the gap distance, such that the first flat member surface aids in controlling strand resonance of the chain and the second flat member surface is adapted to engage the slack strand of the chain to maintain the chain engaged with the driven sprocket and prevent chain slack buildup on the driven sprocket aids in controlling slack of the slack strand of the chain.

2. The chain drive system of claim 1, wherein a length of the first flat member is greater than a length of the second flat member.

3. The chain drive system of claim 1, wherein the angled ramp does not contact the slack strand of the chain.

4. The chain drive system of claim 1, further comprising an angled ramp surface adjacent to the chain, the angled ramp surface not contacting the slack strand of the chain.

5. The chain drive system of claim 1, wherein the gap distance between the slack strand of the chain and the second flat member surface of the first tooth jump protection device is between 1-7 mm.

6. The chain drive system of claim 5, wherein the distance defined between the centerline of the driven sprocket and the second end of the first tooth jump protection device is less than the gap distance of the first tooth jump protection device.

7. The chain drive system of claim 1, wherein the gap distance between the slack strand of the chain and the second flat member surface of the first tooth jump protection device is less than 1 mm.

8. The chain drive system of claim 7, wherein the distance defined between the centerline of the driven sprocket and the second end of the first tooth jump protection device is less than three pitch lengths of the chain.

9. The chain drive system of claim 1, wherein the gap distance between the slack strand of the chain and the second flat member surface of the first tooth jump protection device is 1.5 mm.

10. The chain drive system of claim 9, wherein the distance defined between the centerline of the driven sprocket and the second end of the first tooth jump protection device is one pitch length of the chain.

11. The chain drive system of claim 1, further comprising a second tooth jump protection device mounted at a second engagement of the driven sprocket in which the tight strand of the chain exits the driven sprocket, the second tooth jump protection device comprising: a second tooth jump protection device snubber having a body with a second tooth jump protection device first face and a second tooth jump protection device second face, the second tooth jump protection device snubber fixed to the transfer case, such that the second tooth jump protection device second face is positioned a gap distance from the chain, and the second tooth jump protection device second face is biased a distance away from the drive sprocket for engagement with the chain to maintain the chain engaged with the driven sprocket and prevent chain slack buildup on the driven sprocket.

12. The chain drive system of claim 1, further comprising a second tooth jump protection device mounted at a second engagement of the driven sprocket in which the tight strand of the chain exits the driven sprocket, the second tooth jump protection device comprising: a second tooth jump protection device mounting bracket fixed to the transfer case; and a second tooth jump protection device ramp connected to the second tooth jump protection device mounting bracket comprising: a second tooth jump protection device first flat surface and a second tooth jump protection device second flat surface connected to the second tooth jump protection device first flat surface, the second tooth jump protection device second flat surface having a second tooth jump protection device face for engagement with the chain to maintain the chain engaged with the driven sprocket and prevent chain slack buildup on the driven sprocket, wherein the second tooth jump protection device first flat surface is perpendicular to the second tooth jump protection device mounting bracket.

13. The chain drive system of claim 12, further comprising a stop extending axially from the second tooth jump protection device mounting bracket and aligned with the second tooth jump protection device ramp.

14. The chain drive system of claim 1, further comprising a second tooth jump protection device mounted at a second engagement of the driven sprocket in which the tight strand of the chain exits the driven sprocket,
the second tooth jump protection device comprising:
a second tooth jump protection device mounting bracket fixed to the transfer case;
a second tooth jump protection device ramp connected to the second tooth jump protection device mounting bracket of the second tooth jump protection device comprising: at least a second tooth jump protection device first flat surface, a second tooth jump protection device angled portion, and a second tooth jump protection device roller holder; and
at least one roller of the second tooth jump protection device mounted to the second tooth jump protection device roller holder of the second tooth jump protection device for engaging the chain to maintain the chain engaged with the driven sprocket and prevent chain slack buildup on the driven sprocket;
wherein the second tooth jump protection device first flat surface of the second tooth jump protection device ramp of the second tooth jump protection device is perpendicular to the second tooth jump protection device mounting bracket of the second tooth jump protection device.

15. The chain drive system of claim 1, further comprising a second tooth jump protection device mounted at a second engagement of the driven sprocket in which the tight strand of the chain exits the driven sprocket, the second tooth jump protection device comprising:
a second tooth jump protection device mounting bracket fixed to the transfer case having a second tooth jump protection device pivot pin extending perpendicular therefrom;
a second tooth jump protection device arm comprising a second tooth jump protection device body having a second tooth jump protection device body first end, a second tooth jump protection device body second end, a second tooth jump protection device roller holder at the second tooth jump protection device body second end, and a hole for receiving the second tooth jump protection device pivot pin at the second tooth jump protection device body first end; and
at least one second tooth jump protection device roller mounted to the second tooth jump protection device roller holder for engagement with the chain to maintain the chain engaged with the driven sprocket and prevent chain slack buildup on the driven sprocket; and
a second tooth jump protection device torsion spring mounted between the second tooth jump protection device mounting bracket and the second tooth jump protection device arm for biasing the second tooth jump protection device body first end of the second tooth jump protection device arm on the second tooth jump protection device pivot axle towards the chain.

16. The chain drive system of claim 1, further comprising a second tooth jump protection device mounted at a second engagement of the driven sprocket in which the tight strand of the chain exits the driven sprocket, the second tooth jump protection device comprising:
a second tooth jump protection device mounting bracket fixed to the transfer case;
a second tooth jump protection device ramp connected to the second tooth jump protection device mounting bracket comprising: a second tooth jump protection device first flat surface of a second tooth jump protection device first body portion connected to a second tooth jump protection device angled portion of a second tooth jump protection device second body portion, the second tooth jump protection device angled portion of the second tooth jump protection device second body portion connected to a second tooth jump protection device second flat surface through a second tooth jump protection device first transition portion, the second tooth jump protection device second flat surface having a second tooth jump protection device face for engagement with the chain to maintain the chain engaged with the driven sprocket and prevent chain slack buildup on the driven sprocket; and
a second tooth jump protection device snubber fixed to the second tooth jump protection device mounting bracket and parallel to the second tooth jump protection device first flat surface of the second tooth jump protection device first body portion of the second tooth jump protection device ramp, the second tooth jump protection device snubber having a snubber face for engagement with the chain between the driven sprocket and the drive sprocket;
wherein the second tooth jump protection device first flat surface of the second tooth jump protection device first body portion of the second tooth jump protection device ramp is perpendicular to the second tooth jump protection device mounting bracket.

17. The chain drive system of claim 16, wherein the second tooth jump protection device face of the second tooth jump protection device snubber to engage the chain further comprises a first pad and wherein the second tooth jump protection device second flat surface of the second tooth jump protection device ramp further comprises a second pad.

18. The chain drive system of claim 1, further comprising a second tooth jump protection device mounted at a second engagement of the driven sprocket in which the tight strand of the chain exits the driven sprocket, the second tooth jump protection device comprising: a bolt fixed to the transfer case and a rolling element rotatable around the bolt.

19. The chain drive system of claim 1, further comprising a second tooth jump protection device mounted at a second engagement of the driven sprocket, the second tooth jump protection device comprising: a snubber having a body with a first end and a second end separated by a length, the body comprising a first flat member at the first end, a second flat member at the second end and an angled ramp connecting the first flat member to the second flat member, the first flat member having a first flat member surface for contacting the tight strand of the chain and a second flat member surface of the second flat member defining a gap distance, such that the first flat member surface aids in controlling strand resonance of the chain and the second flat member surface is adapted to engage the tight strand of the chain to maintain the chain engaged with the driven sprocket and prevent chain slack buildup on the driven sprocket aids in controlling slack of the tight strand of the chain.

20. The chain drive system of claim 19, wherein the gap distance between the tight strand of the chain and the second flat member surface of the second tooth jump protection device is between 1-7 mm.

21. The chain drive system of claim 20, wherein a distance defined between the centerline of the driven sprocket and the second end of the body of the snubber of the second tooth jump protection device is less than the gap distance of the second tooth jump protection device.

22. The chain drive system of claim 19, wherein the gap distance between the tight strand of the chain and the second flat member surface of the second tooth jump protection device is less than 1 mm.

23. The chain drive system of claim 22, wherein a distance defined between the centerline of the driven sprocket and the second end of the body of the snubber of the second tooth jump protection device is less than three pitch lengths of the chain.

24. The chain drive system of claim 19, wherein the gap distance between the tight strand of the chain and the second flat member surface of the second tooth jump protection device is 1.5 mm.

25. The chain drive system of claim 24, wherein a distance defined between the centerline of the driven sprocket and the second end of the body of the snubber of the second tooth jump protection device is one pitch length of the chain.

26. A chain drive system in a transfer case, the chain drive system comprising:
  a drive sprocket;
  a driven sprocket;
  a chain connecting the drive sprocket to the driven sprocket, the chain having a slack strand between the driven sprocket and the drive sprocket and a tight strand between the driven sprocket and the drive sprocket; and
  at least a first tooth jump protection device mounted between the driven sprocket and the drive sprocket on the slack strand of the chain, with the first tooth jump protection device installed within the chain drive system at a distance defined between a centerline of the driven sprocket and a first end of the first tooth jump protection device and defining a gap distance between the at least first tooth jump protection device and the slack strand of the chain;
  wherein the first tooth jump protection device comprises a first tooth jump protection device snubber having a body with the first end and a second end separated by a length, the body comprising a first flat member at the first end connected to a first end flange, a second flat member at the second end connected to a second end flange and an angled ramp connecting the first flat member to the second member, the first flat member having a first flat member surface for contacting the slack strand of the chain and a second flat member surface of the second flat member defining the gap distance, such that the first flat member surface aids in controlling strand resonance of the chain and the second flat member surface is adapted to engage the slack strand of the chain to maintain the chain engaged with the driven sprocket and prevent chain slack buildup on the driven sprocket aids in controlling slack of the slack strand of the chain.

27. The chain drive system of claim 26, wherein a first end cavity is formed between the first end flange and a first surface of the of the second flat member of the first tooth jump protection device, receiving a portion of a bracket and a second end cavity is formed between the second end flange and a first surface of the first flat member, receiving another portion of the bracket.

28. The chain drive system of claim 26, further comprising a plurality of mounting bosses between the first end flange and the second end flange of the body of the snubber of the first tooth jump protection device, mounting the first tooth jump protection device to a first bracket mounted to the transfer case.

29. The chain drive system of claim 26, further comprising a second tooth jump protection device comprising a snubber having a body with a first end and a second end separated by a length, the body of the second tooth jump protection device comprising a first flat member at the first end connected to a first end flange, a second flat member at the second end connected to a second end flange and an angled ramp connecting the first flat member to the second member, the first flat member having a first flat member surface for contacting the slack strand of the chain and a second flat member surface of the second flat member defining the gap distance, such that the first flat member surface aids in controlling strand resonance of the chain and the second flat member surface is adapted to engage the tight strand of the chain to maintain the chain engaged with the driven sprocket and prevent chain slack buildup on the driven sprocket aids in controlling slack of the tight strand of the chain.

\* \* \* \* \*